US007165038B1

(12) United States Patent  
Singh et al.

(10) Patent No.: US 7,165,038 B1
(45) Date of Patent: Jan. 16, 2007

(54) SYSTEM USING ELECTRONIC CAMPAIGN YARD SIGN FOR GATHERING SUPPORTS FROM EMAIL RECIPIENTS

(76) Inventors: Ravneet Singh, 1480 Burr Oak Cir., Aurora, IL (US) 60506; Simerneet Singh, 1480 Burr Oak Cir., Aurora, IL (US) 60506

( * ) Notice: Subject to any disclaimer, the term of this patent is extended or adjusted under 35 U.S.C. 154(b) by 688 days.

(21) Appl. No.: 09/898,509

(22) Filed: Jul. 3, 2001

Related U.S. Application Data

(60) Provisional application No. 60/216,165, filed on Jul. 3, 2000.

(51) Int. Cl.
    *G07C 13/00* (2006.01)
(52) U.S. Cl. .......................... 705/12; 709/206
(58) Field of Classification Search ................ 709/203, 709/206, 224; 707/104.1; 705/14, 10, 12; 715/764; 455/3.04
    See application file for complete search history.

(56) References Cited

U.S. PATENT DOCUMENTS

| 5,754,939 | A | * | 5/1998 | Herz et al. ................. 455/3.04 |
| 5,793,972 | A | * | 8/1998 | Shane ......................... 709/219 |
| 5,796,952 | A | * | 8/1998 | Davis et al. ................. 709/224 |
| 5,809,242 | A | * | 9/1998 | Shaw et al. ................. 709/217 |
| 5,848,396 | A | * | 12/1998 | Gerace ......................... 705/10 |
| 5,848,397 | A | * | 12/1998 | Marsh et al. ................. 705/14 |
| 6,311,190 | B1 | * | 10/2001 | Bayer et al. ............. 707/104.1 |
| 6,377,936 | B1 | * | 4/2002 | Henrick et al. ............... 705/14 |
| D489,765 | S | * | 5/2004 | Schaller ...................... D20/10 |
| 6,765,594 | B1 | * | 7/2004 | Hautt et al. ................. 715/764 |
| 2002/0032738 | A1 | * | 3/2002 | Foulger et al. ............. 709/206 |

OTHER PUBLICATIONS

Dana Milbank, "Virtual Politics", Democracia Electronica.*
Corrado, "Campaigns in Cyberspace Toward a New Regulatory Approach", Jan. 2000, Aspen Institute, pp. i-ix, 1-44.*

* cited by examiner

Primary Examiner—Le Hien Luu
(74) Attorney, Agent, or Firm—Cardinal Law Group

(57) ABSTRACT

A method and system to empowers a candidate to design and customize his/her own "Yard sign." The candidate may send out his/her message to multiple email addresses that he/she has collected. The process can be conducted over the Internet in a form similar to a mass mailing. This form of permission email based system allows the user to communicate with the constituents that he/she is trying to attract in a paperless form, saving time and money.

14 Claims, 28 Drawing Sheets

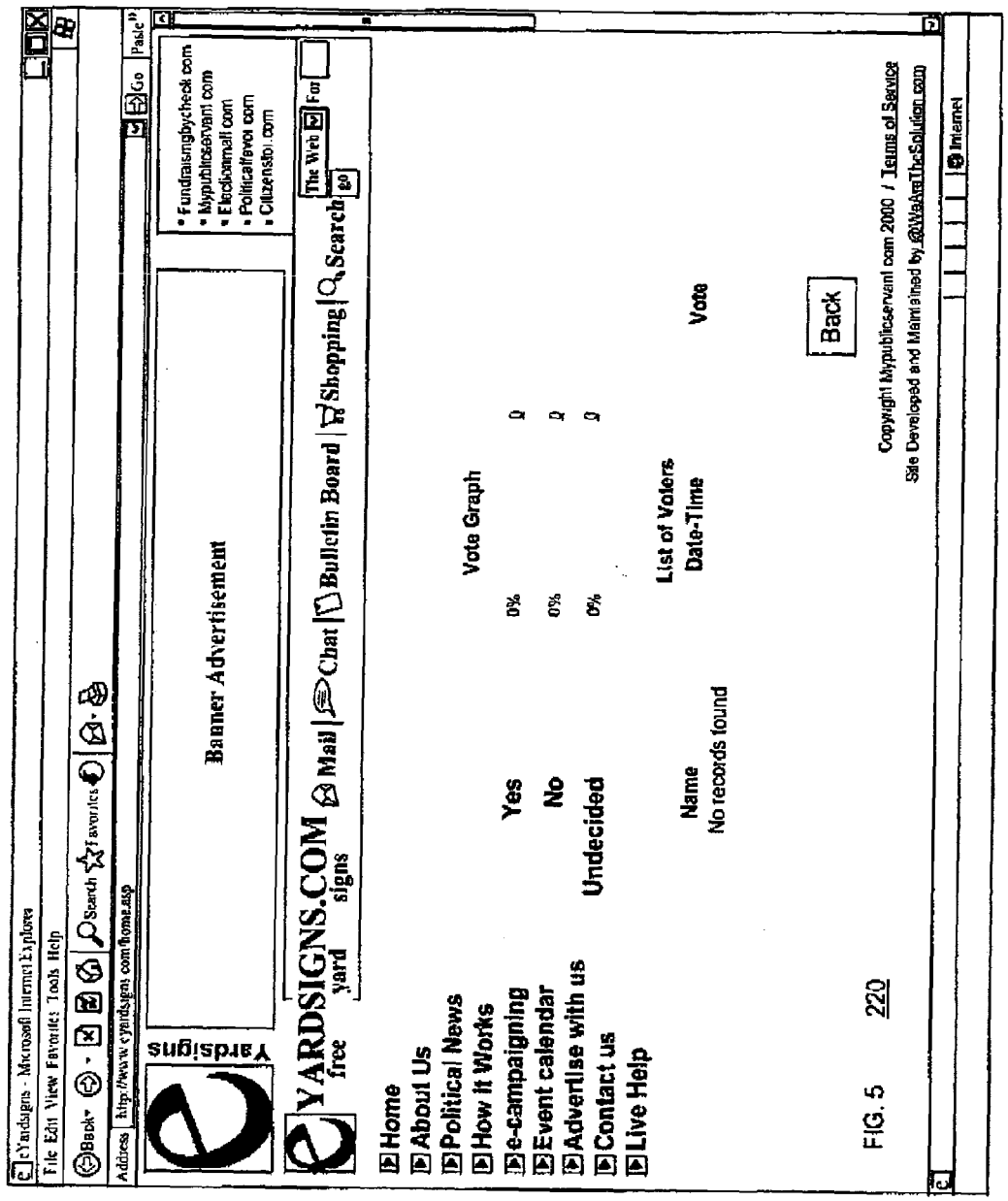
FIG. 5    220

ELECTIONMALL.COM FLOW CHART

1.) Homepage – Once the user has logged in, this would be the main gateway to the portal. At this point, the user is given four (4) primary options which are:
   A. Email Maintenance
   B. Choose Design
   C. Mail Tracking
   D. Search 1a.) Email Maintenance – Allows the user to Maintain their Email Lists by adding (uploading) and deleting Emails, creating or deleting Lists all in one place.

1b.) Maintain List – Individual or multiple Email addresses may be added to a chosen List, as well as deleting Emails. User may also Move selected Emails to other Lists.

1c.) Instructions for Importing Addresses – Step by step instructions for uploading Email Addresses directly from Desktop email clients such as Outlook, Outlook Express, Palm Desktop, and Netscape Client. Other web based Email providers will follow.

1d.) Confirmation – Basic screen that lets the user know Upload was successful onto chosen List. Once the user clicks continue, he/she will return back to Email Maintenance.

1e.) Create New List – User first chooses a new name for List and clicks Go.

1f.) Confirmation – Once the name is valid and created, the user will be allowed to add (upload) and delete Email Addresses, as well as Move Email Addresses to other Lists. User may return directly to Email Maintenance or Create eYardsign from this screen.

2a.) Choose Design – User has been given option to choose a pre-designed eYardSign.

FIG.6A   100

2b.) Fill Form – User will fill in form to create eYardSign. The following is the required information for this form:
- First Name
- Last Name
- Office (For example, Mayor or Treasurer)
- Return Email Address (place where all replies should be sent)
- Subject (email subject)
- Title (for example, Midwest region or Santa Clara County)
- Option 1 – select a pre-designed logo
- Option 2 – Upload personal logo from user's desktop
- Music – Select pre-assigned musical tune if wanted 2c.) Select List – User will select List(s) that the eYardSign should be sent to.

2d.) Preview – At this point the user may preview the eYardSign prior to sending it out. If all is appropriate, user may send out the eYardSign.

2e.) Mail Sent Confirmation – Once the eYardSign has been successfully sent, this screen will assure the user that the eYardSign was sent to the selected List(s). User will continue and be automatically directed to the Home Page.

3a.) Mail Tracking – A detailed reporting area for results from the eYardSign that were sent out. User has capabilities to review the history of all eYardSigns that he/she has ever created, as well as see the actual eYardSign graphic.

4a.) Search – This function is comprised of four (4) search capabilities
  A. Volunteering – The user has the option to search via date, city, or zip code for particular volunteers. He/she may also search for criteria that the volunteer may be interested in.
  B. Send to a Friend – The user has the option to search by date, gender, or zip code for all people that were sent to a friend.
  C. Voters – The user may search by date range to view graphical representation of all votes that he/she received via eYardSigns that were sent out. The results are viewed as Yes, No, or Undecided. The user also has the option to email the votes directly from this location by clicking on their name(s).
  D. Donators – This option gives the user the capability to search for Donators by date, amount of donations, and zip code.

Select List you want to send the eYardsign to, or enter email address directly

Step 3: Select Target List(s)

Contacts (0)
Kesh (0)
Kesh Daddy (1)
Sachin (1)
Volunteers (0)
Voters (0)

Choose list(s) from above by clicking ">>"

OR

Enter ONE email address

[Back]  [Send]

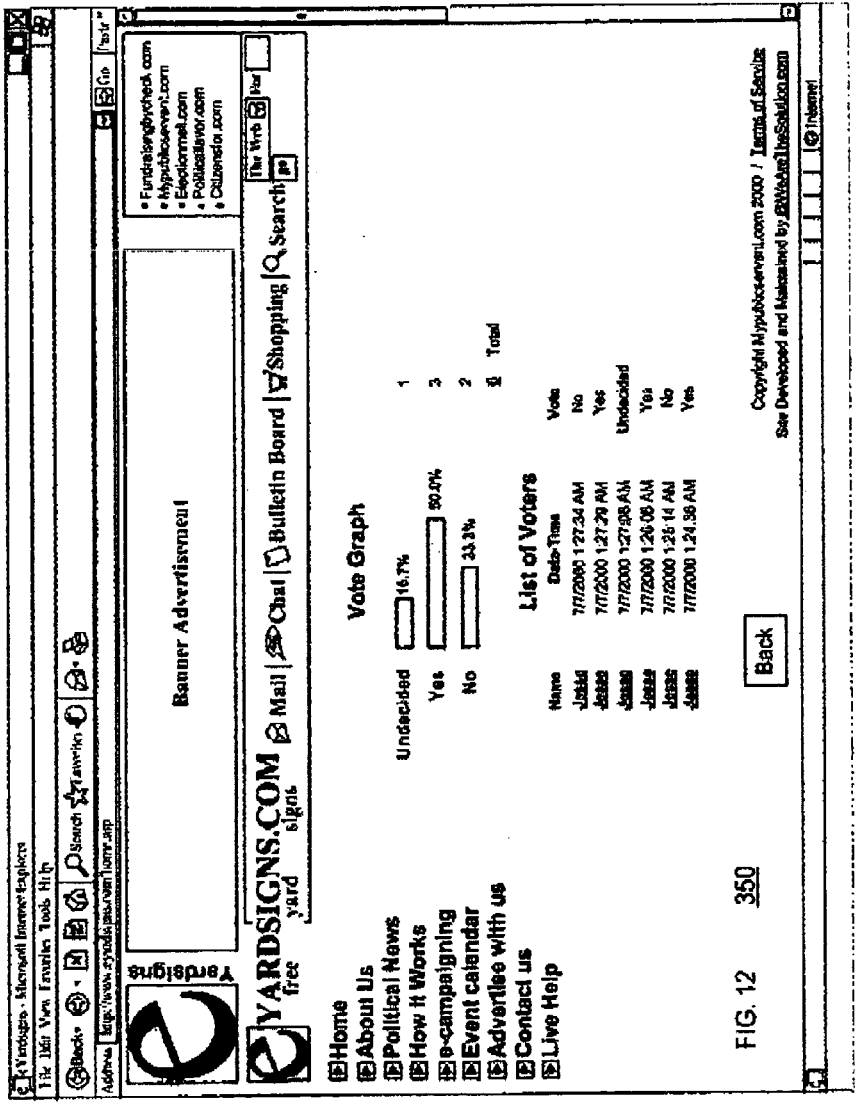
FIG. 12    350

List of people who forwarded eYardSign to their friends along with emails of people it was forwarded to

FIG. 13   370

List of Volunteers who responded to a particular eYardSign

FIG. 14   38

SYSTEM USING ELECTRONIC CAMPAIGN YARD SIGN FOR GATHERING SUPPORTS FROM EMAIL RECIPIENTS

RELATED APPLICATIONS

This application claims the benefit of U.S. Provisional Application No. 60/216,165, filed Jul. 3, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

The present invention relates to an electronic format for providing political campaign material.

BACKGROUND OF THE INVENTION

Currently, political campaigns have utilized traditional media for transmitting the message of a political candidate. Print media, radio, television, telephone and direct mail are methods primarily used to educate the voter on a specific candidate's platform and his/her messages, as well as to create name recognition. As Internet usage increases in this country, more and more people have access to the Internet and the political arena. Furthermore, a good portion of those who have access to the Internet are educated and more likely to vote. Therefore, "e-Campaigning," campaigning over the Internet, has become more common. During the 2000 primary election campaigns, all Presidential candidates had an Internet site. However, what they did with it and how they utilized it to help them gain voters and name recognition, as well as funding, was very poor.

SUMMARY OF THE INVENTION

The present invention changes that, while allowing free access. In addition, the present invention empowers the candidate to design and customize his/her own "Yard sign." The present invention also allows the candidate to send out his/her message to multiple email addresses that he/she has collected. This process is similar to a direct mailing, but only this time is conducted over the Internet. This form of permission email based system allows the user to communicate with the constituents that he/she is trying to attract in a paperless form, saving time and money.

BRIEF DESCRIPTION OF THE DRAWINGS

FIGS. 1A and 1B illustrates one embodiment of sign-in entry forms, made in accordance with the present invention;

FIG. 2B illustrates one embodiment of a sign option page, made in accordance with the present invention;

FIG. 5 illustrates one embodiment of a search results page, made in accordance with the present invention;

FIG. 6 illustrates a block diagram of the present invention and FIG. 6A–6B illustrates a flow chart of an embodiment of the present invention;

FIG. 10B illustrates one embodiment of an e-mail target page;

FIG. 11 illustrates one embodiment of a search page;

FIG. 12 illustrates one embodiment of a poll feature page;

FIG. 13 illustrates one embodiment of an e-mail result page; and

FIG. 14 illustrates one embodiment of a volunteer result page.

DETAILED DESCRIPTION OF THE PRESENTLY-PREFERRED EMBODIMENTS

Figure 1:
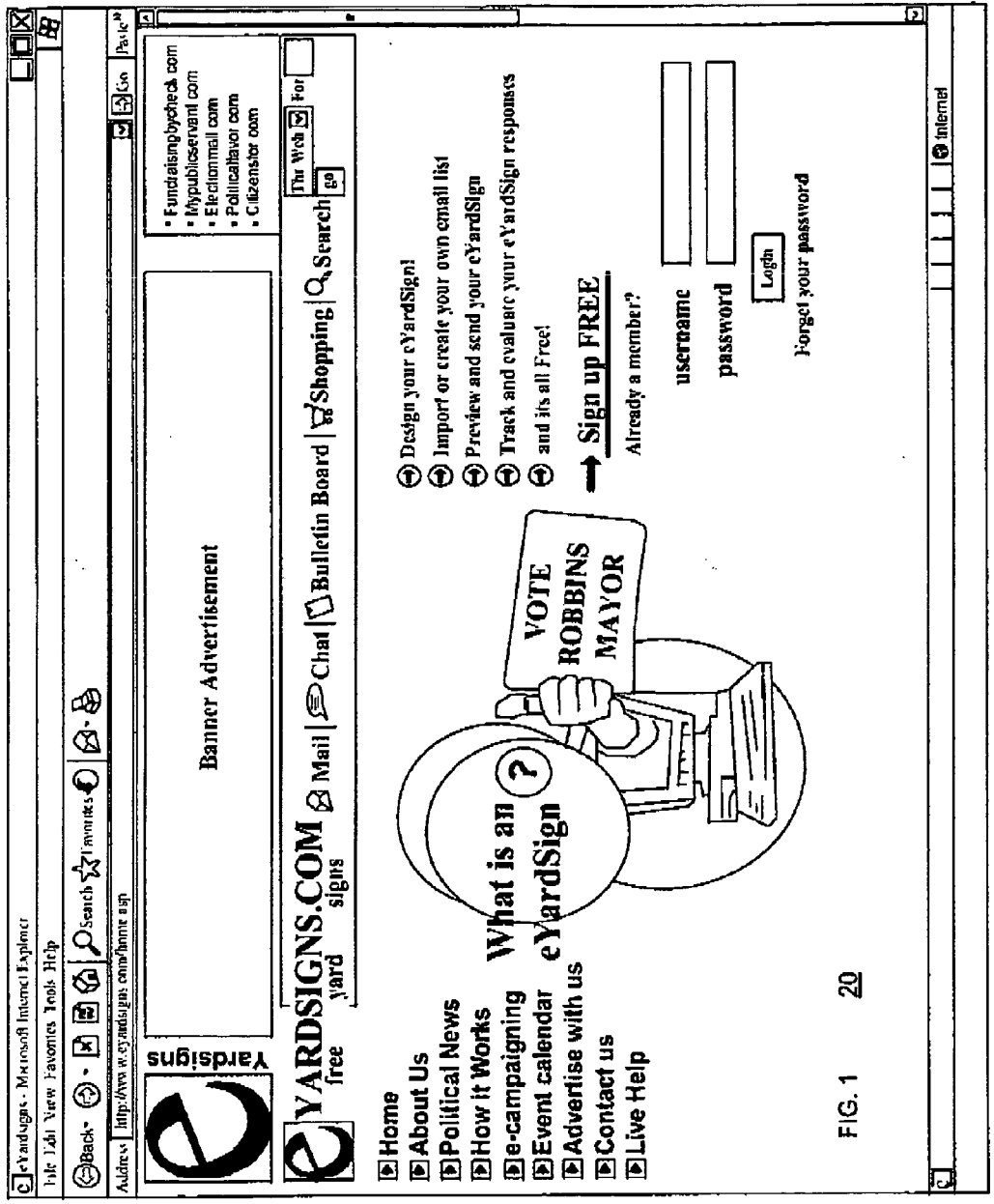
FIG. 1 illustrates a home page, made in accordance with the present invention.

The present invention concerns the electronic re-creation of physical campaign yard signs that are placed in yards during campaigns across the country. Traditionally, the yard sign, provides information of the candidate's name and the desired office.

The website architecture of the present invention attempts to take advantage of the fundamental embodiment of modern campaign strategy. To this end, the present invention has developed proprietary online advocacy technology which the user may customize based on specific needs, look, and feel for their campaigns.

In addition, the present invention possesses the ability to customize and send multiple online messages with information to a specific permission based targeted list of recipients. Furthermore, the present invention allows the candidate-user to add features, such as, for example, a campaign logo, a picture, a party affiliation and patriotic music, as well as to send an embodiment of a "yard sign" to one or more of the list(s) that the candidate has created.

In addition, the present invention empowers the candidate-user to take control of sending out email notices to volunteers, voters, and others. The candidate-user may have the option to add more categories to this list and control the timings of these emails and designs. The present invention may also maintain a database of this information so that the candidate-user will see the history-track record of information that has been sent. An electronic response may be sent back to the candidate-user confirming the yard sign campaign based on the email address that the candidate-user establishes.

Additionally, advertisement within the present invention may be marketed by the present invention in the form of, for example, banner ads and ad placements on the emails with just a URL.

Also, when the yard sign is sent out to individuals, there may be options below for the individual recipients.

There may be an option to link to a Head Quarters or official site for a politician. This option will preferably not directly link straight to the politician's web site. It first opens the browser window of the recipient, and will basically show some ad banners etc, and tell the user to 'click-here,' if they would like to view the politician's web site. This feature will allow the user to not only direct voters to the politician's site as an enhanced feature for future usage by the politician, but also create advertising revenue for the present invention due to through traffic via our site first.

There may be an option to donate to a political candidate. Preferably, this feature allows the recipient to contribute to the sender's campaign. It will direct the user to a secondary site, where the donation can be made. The contributor will see detailed information on how they may be able to donate either by check or credit card via the Internet. The present invention may generate revenue by receiving a small commission for every donation made through the secondary site.

There may be an option to volunteer to a political candidate. By entering this option, the recipient will enter a volunteer form, operated by the present invention. This area will explain to the volunteer that they would like to be submitted as a volunteer for the politician's campaign. This form will be filled out by the volunteer and then when completed, it will automatically be sent directly to the specified email contact for that political party's campaign. There may also be advertising banners on Volunteer form as well.

An option may exist to send the yard sign to another individual. This option may allow the recipient to send the yard sign that he/she received to another individual. A new browser window will preferably appear, which will allow the user to enter one or more email addresses to their friends. This browser window will also have ad banners, etc.

An option may also exist to allow the user to directly arrive at the home page of the present invention. Here they will also have access to other portals—which are full of information.

Additionally, the present invention may provide for data mining of the information collected through the permission Web-based platform of the site. This information may also be resold for future use.

The system of the invention may reside on a communication node. Users may communicate with the system and node via the World Wide Web (WWW) or other interactive means. Recipients and Users may access nodes of the system using standard browsers software (i.e. Netscape, Microsoft Internet Explorer, running on a PC or other communication device with Internet connection).

Unlike existing email systems, this system allows the recipient of the email to be interactive with the sender. This allows the sender to track the recipient's interaction with the eyard sign and its respective functions.

Referring to FIGS. 6A and 6B, and generally indicated at 80, 100, respectively, a user accessing a home page, (illustrated generally at 20, in FIG. 1) may, for example, be presented with variety of options including: design of electronic yard sign; import/create email list; preview and send electronic yard sign; and track and evaluate electronic yard sign response. The source code for one embodiment of the invention is attached as an Appendix.

Figure 1A:
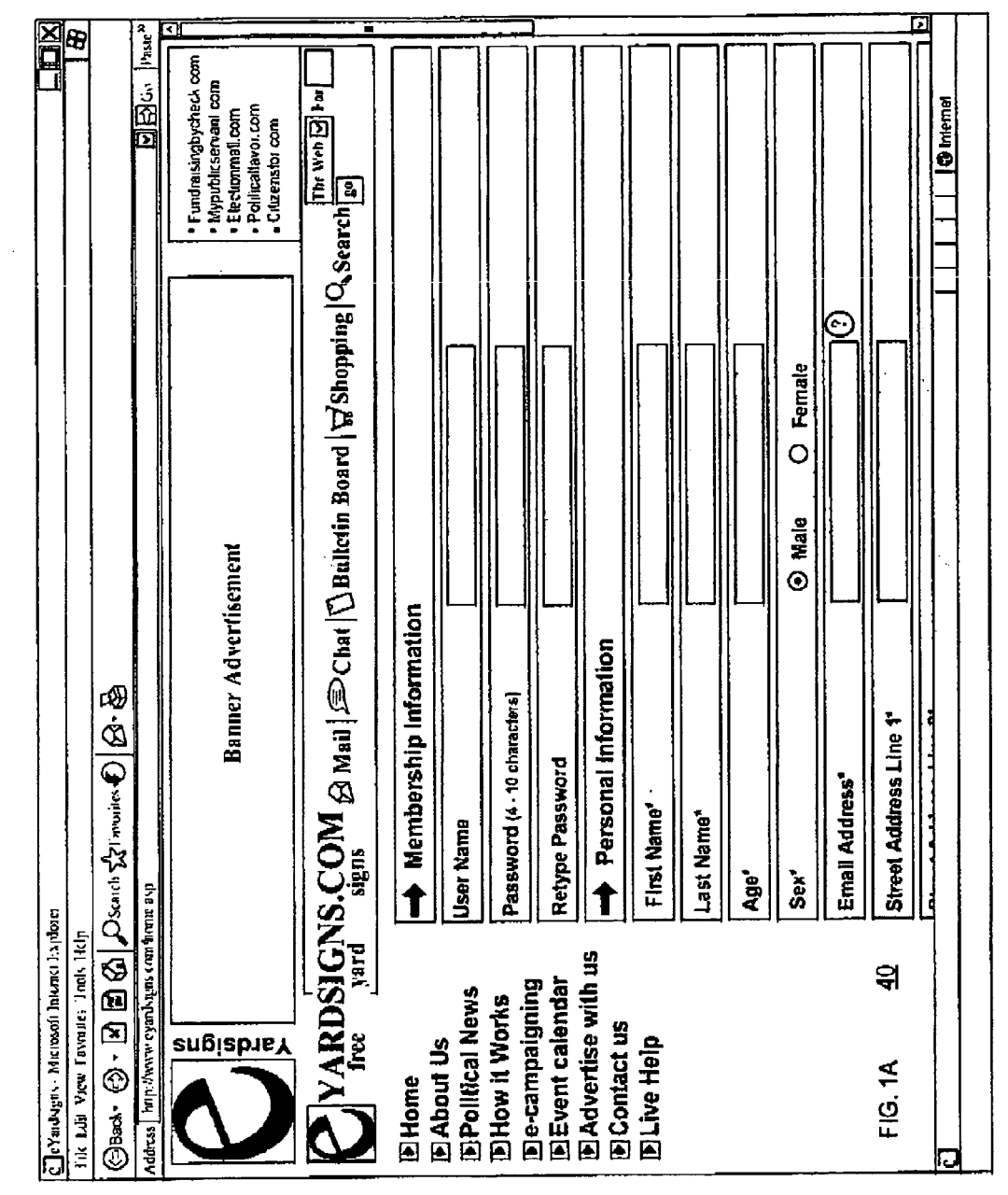
Figure 1B:
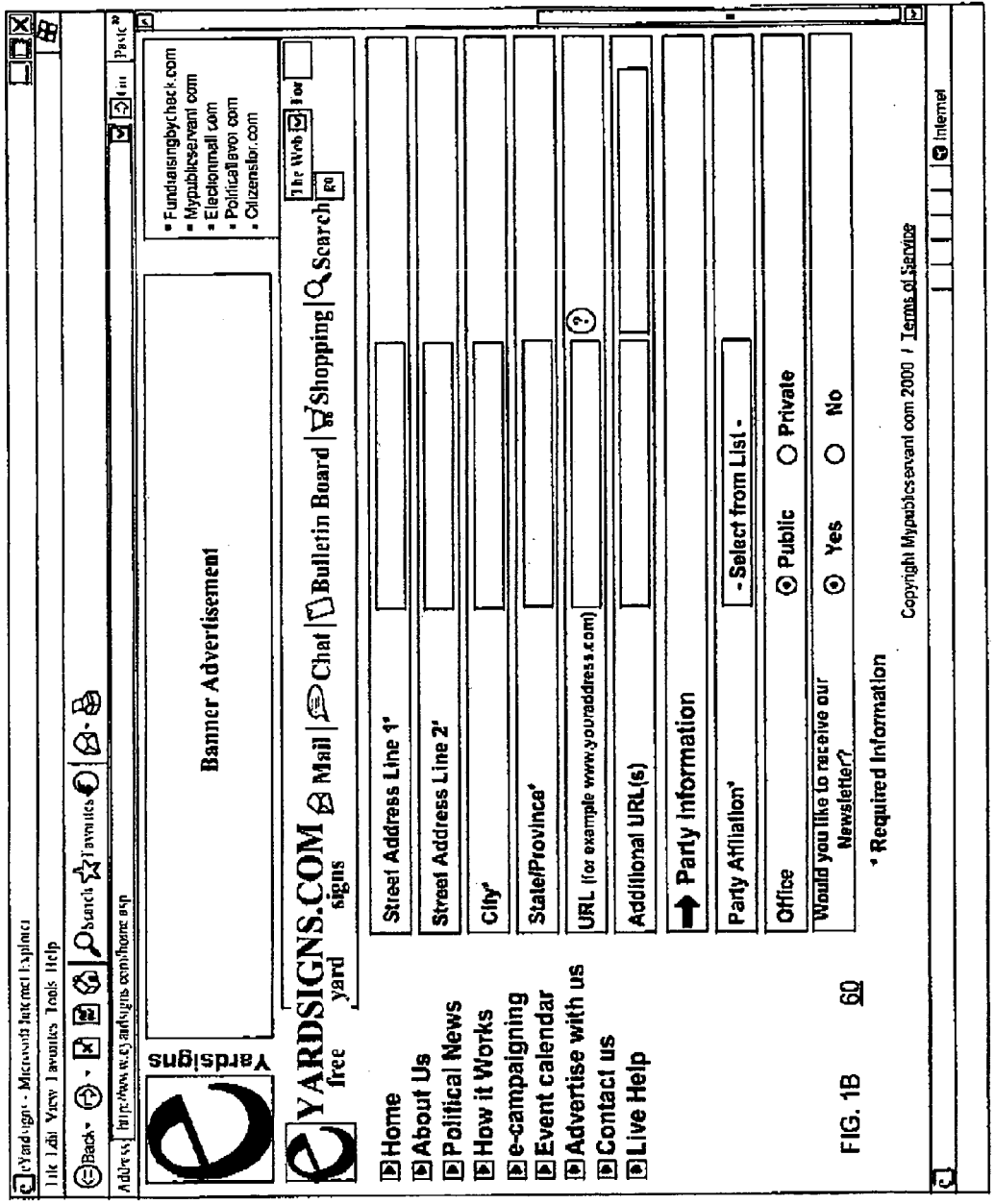
Figure 6:
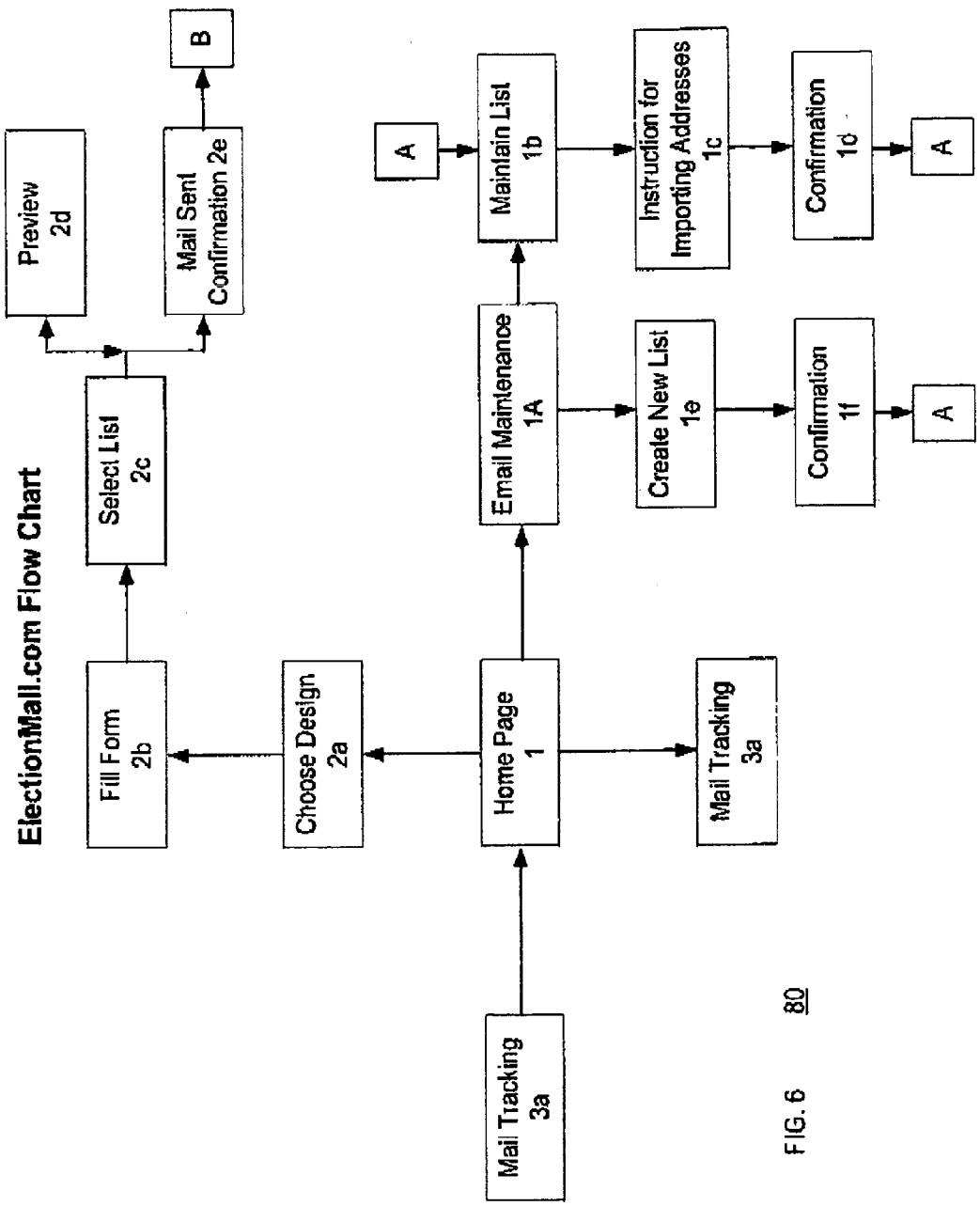

Referring to FIGS. 1A and 1B, and illustrated generally at 40 and 60, the user is presented with a screen requesting personal, membership and party information. The user may use, for example, the mypublicservant.com web page to create a home page headquarters. The source code for one embodiment of the headquarters creation web page is attached hereto as an Appendix. Referring to FIG. 6, once the list is created a confirmation is sent to user.

Figure 2:
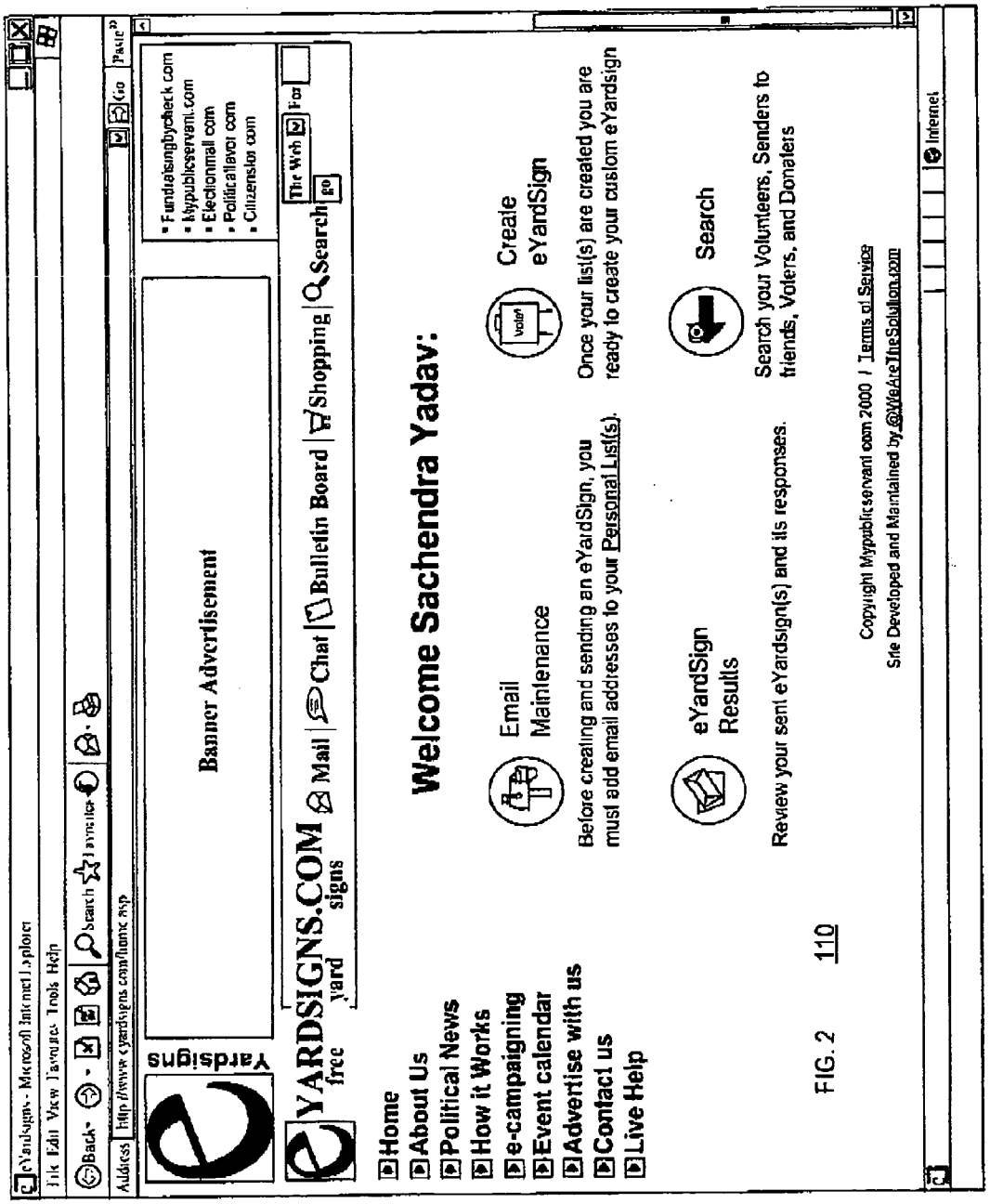
FIG. 2 illustrates one embodiment of an access page, made in accordance with the present invention.

Once the user logs in he is presented with access screen (illustrated generally at 110 in FIG. 2). Four options can be presented, including: making an email maintenance list (FIG. 1A); create electronic yard sign (2a–2f of FIG. 6); eyardsign results (3a of FIG. 6); and a search function (4a of FIG. 6).

Figure 1C:
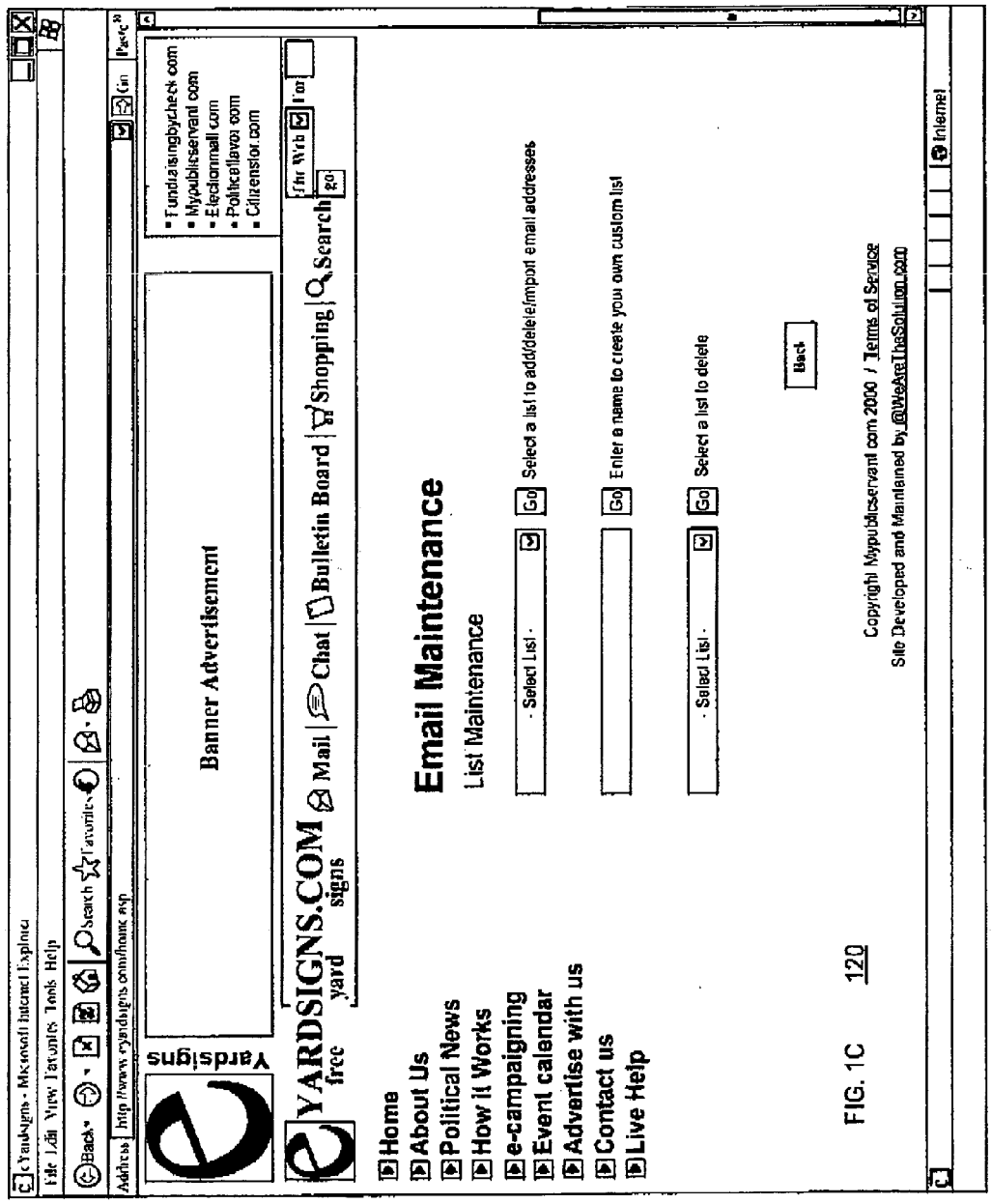
FIG. 1C illustrates an embodiment of an email maintenance page made in accordance with the invention.

Referring to FIG. 1C, and illustrated generally at 120, the user may review an existing list (1b of FIG. 6) and import addresses to add to the list (1c of FIG. 6). A confirmation (1d) will be sent after maintenance is completed. The user may also create a new list (1e). A confirmation can be sent once this function is completed (1f).

Figure 2A:
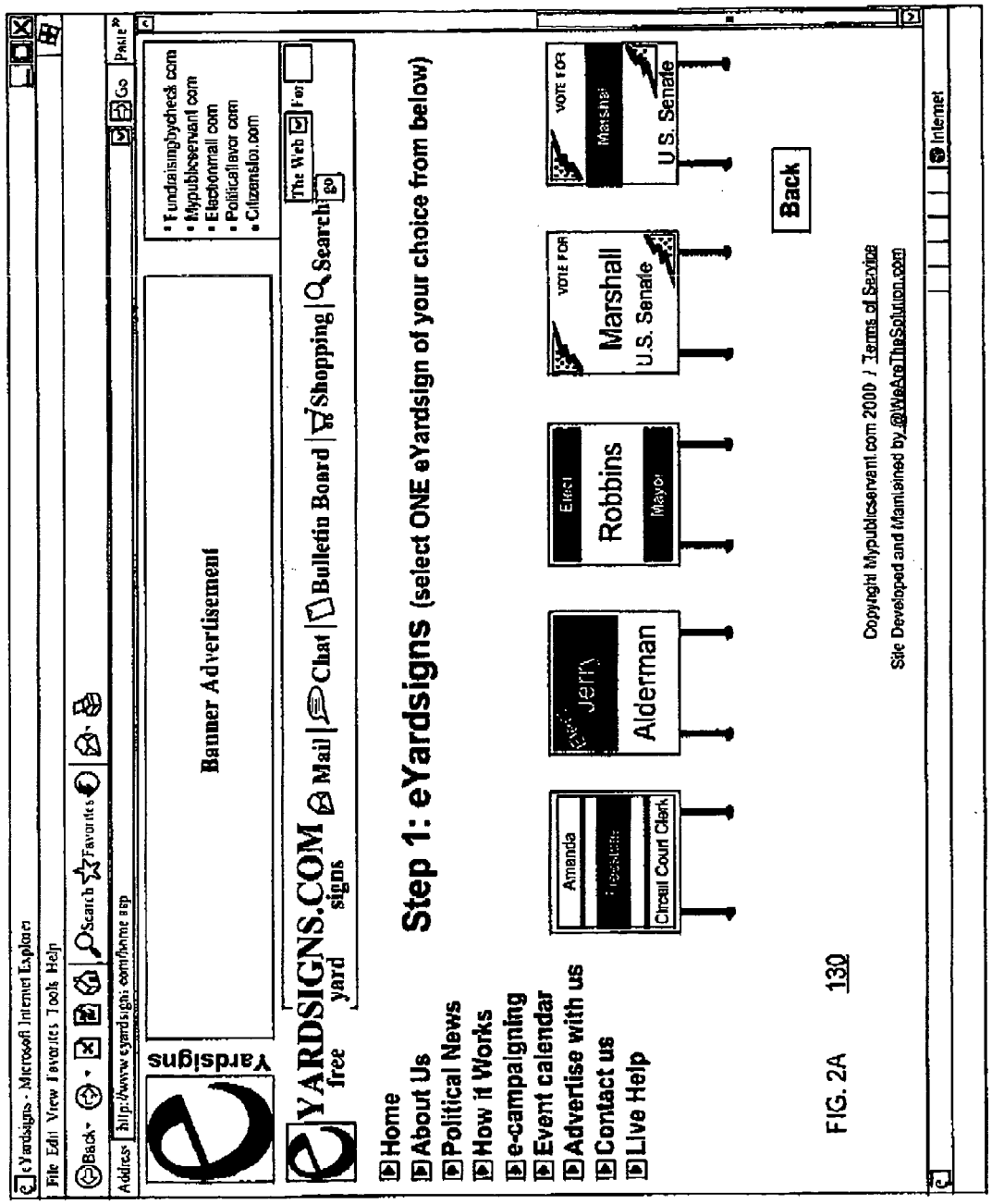
FIG. 2A illustrates one embodiment of a sign selection page, made in accordance with the present invention.
Figure 2B:
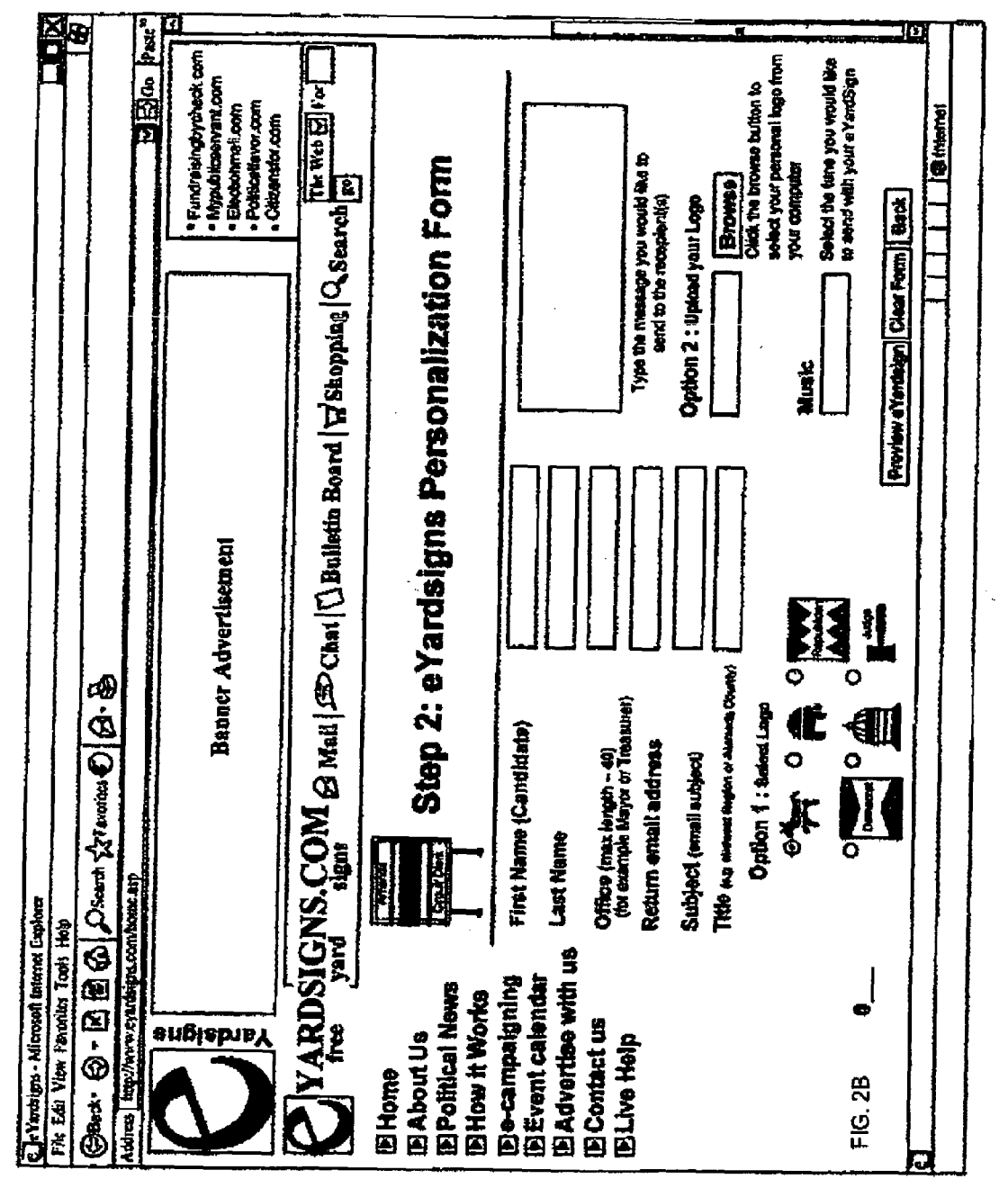

Referring to FIG. 2A, and illustrated generally at 130, the user may select from a variety of different sign configurations. Once selected, the user can be presented with form (FIG. 2B, illustrated generally at 140) to information used on signage.

Figure 2C:
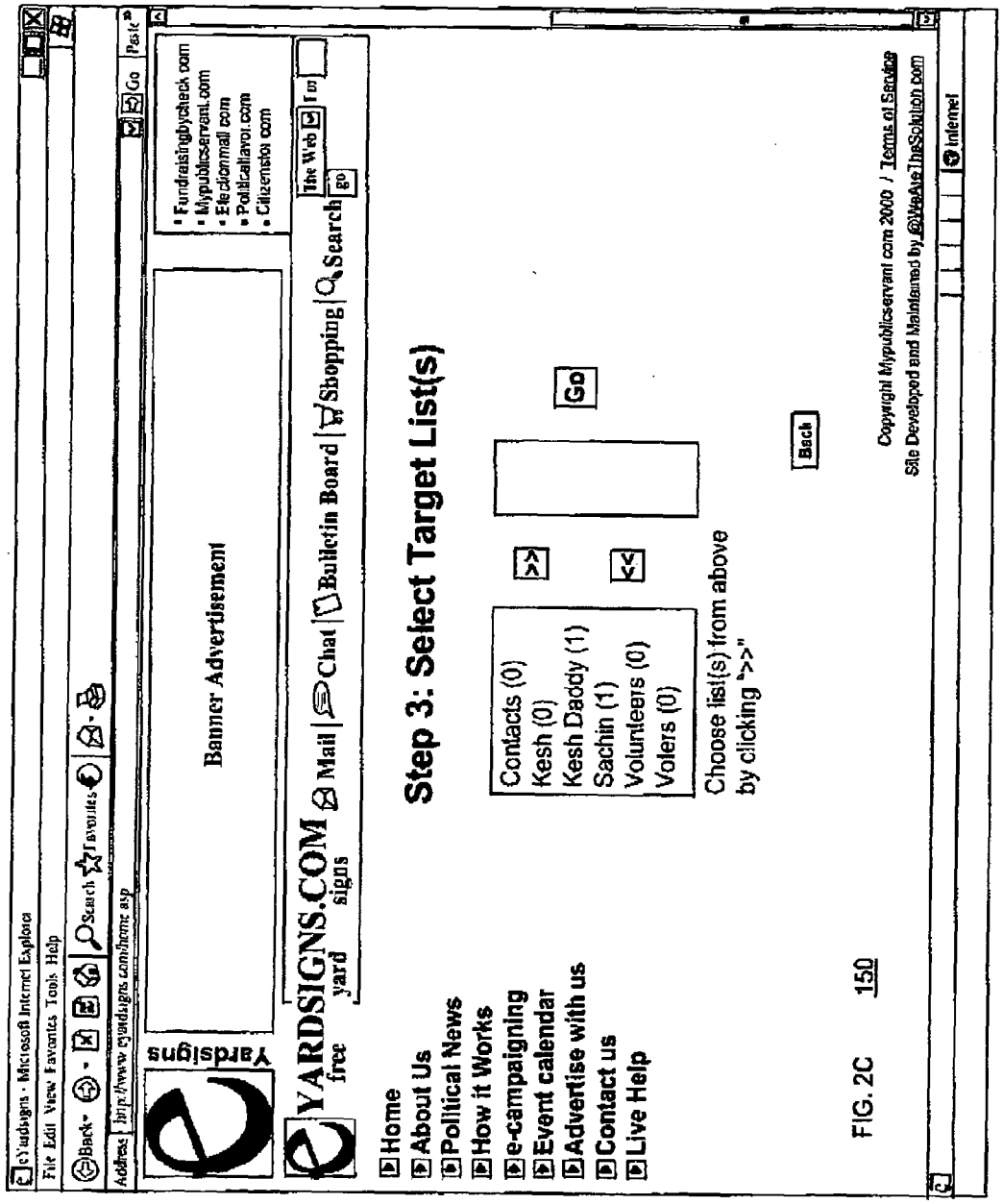
FIG. 2C illustrates one embodiment of a target list page, made in accordance with the present invention.
Figure 2D:
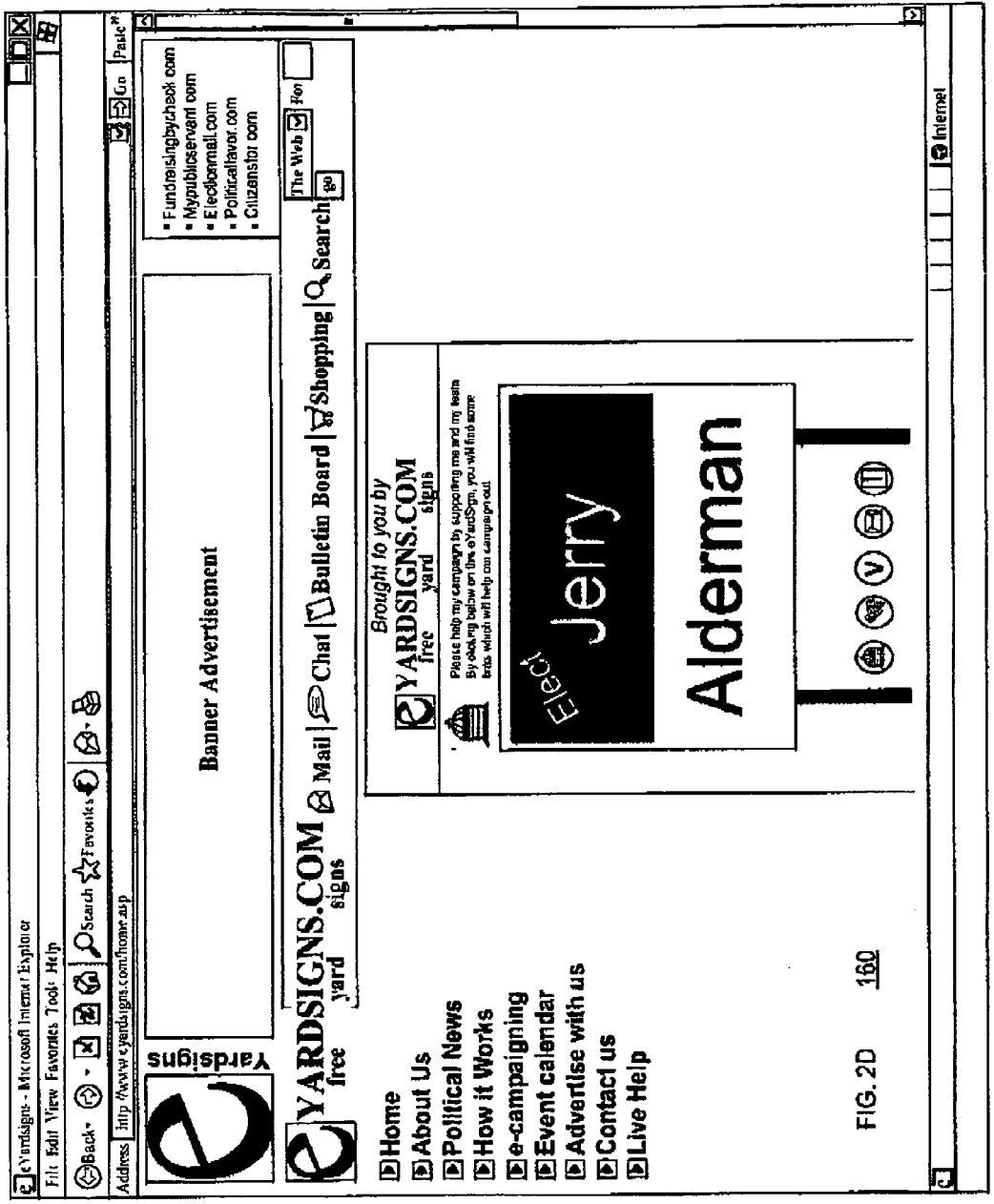
FIG. 2D illustrates one embodiment of a sign preview page, made in accordance with the present invention.

Referring to FIG. 6, once form is completed, a target list is selected 2c using the form of FIG. 2C, illustrated generally at 150. The created sign may be reviewed 2d as shown in FIG. 2D, illustrated generally at 160. The created yard sign may then be sent to all email addresses on selected list. A confirmation 2f is then sent to the user. A database containing the recipients' email address and may also include fields for receiving target information on the recipient's is created.

FIG. 2D illustrates the electronic yard sign that would be received by the people on the selected list. In the embodiment shown, five buttons are presented representing different functions. One function allows the yard sign recipient to directly contact the candidate's headquarters. Another function allows the recipient to make a donation to the candidates campaign. If this function is selected, the user may receive a web page having a form to directly make a donation by credit card. For example, the recipient may receive the fundraisingbycheck.com home page. The source code for one embodiment of the forms used in receiving a direct donation is attached at the appendix. Another function allows the person to volunteer his/her services to the campaign. Another function allows the recipient to send the electronic yard sign to one or more other email addresses. Another function allows the recipient to declare his/her intention to vote for or against the candidate.

The input from the recipients relating to the above functions may be stored in the created database. This database may be searched by the user.

Figure 3A:
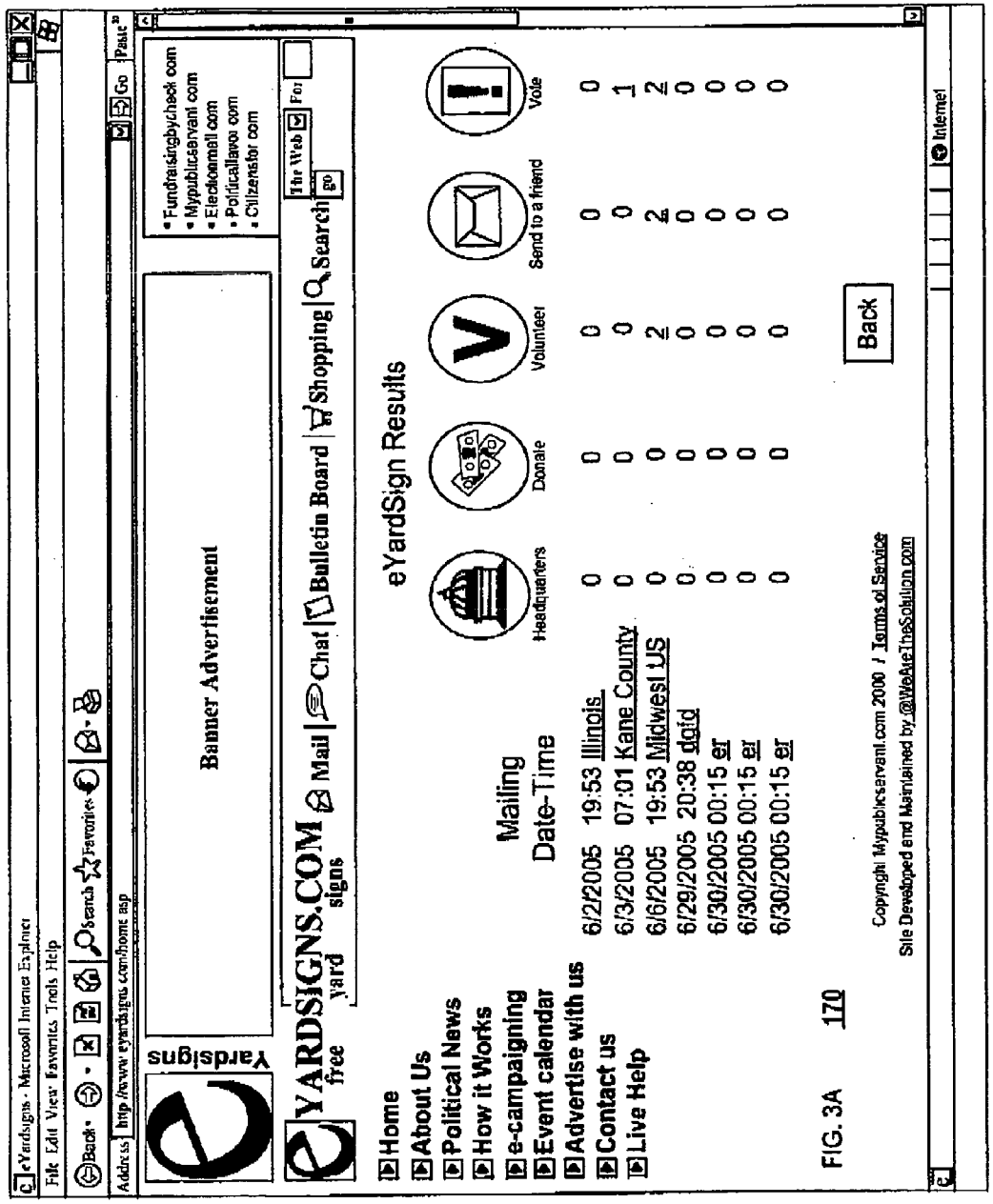
FIG. 3A illustrates one embodiment of a results page, made in accordance with the present invention.

Referring to FIG. 3A, and illustrated generally at 170, the user, being the sender and/or candidate, may track how many of the electronic yard sign recipients contacted headquarters, made a donation, volunteered their services to the campaign, forwarded the electronic yard sign to friends, and are willing to vote for or against the candidate.

Figure 4A:
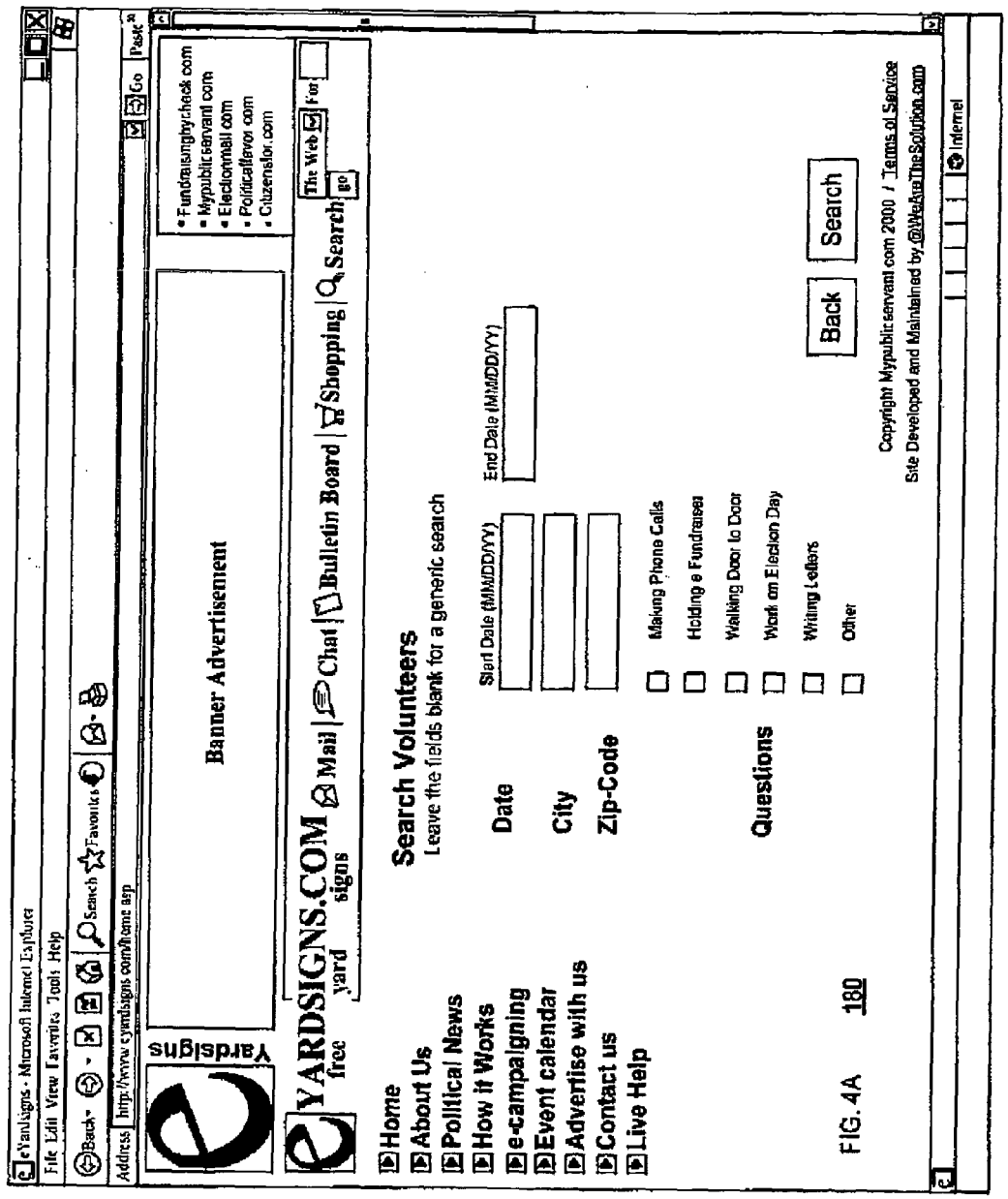
FIGS. 4A–4D illustrate embodiments of search input pages, made in accordance with the present invention.
Figure 4B:
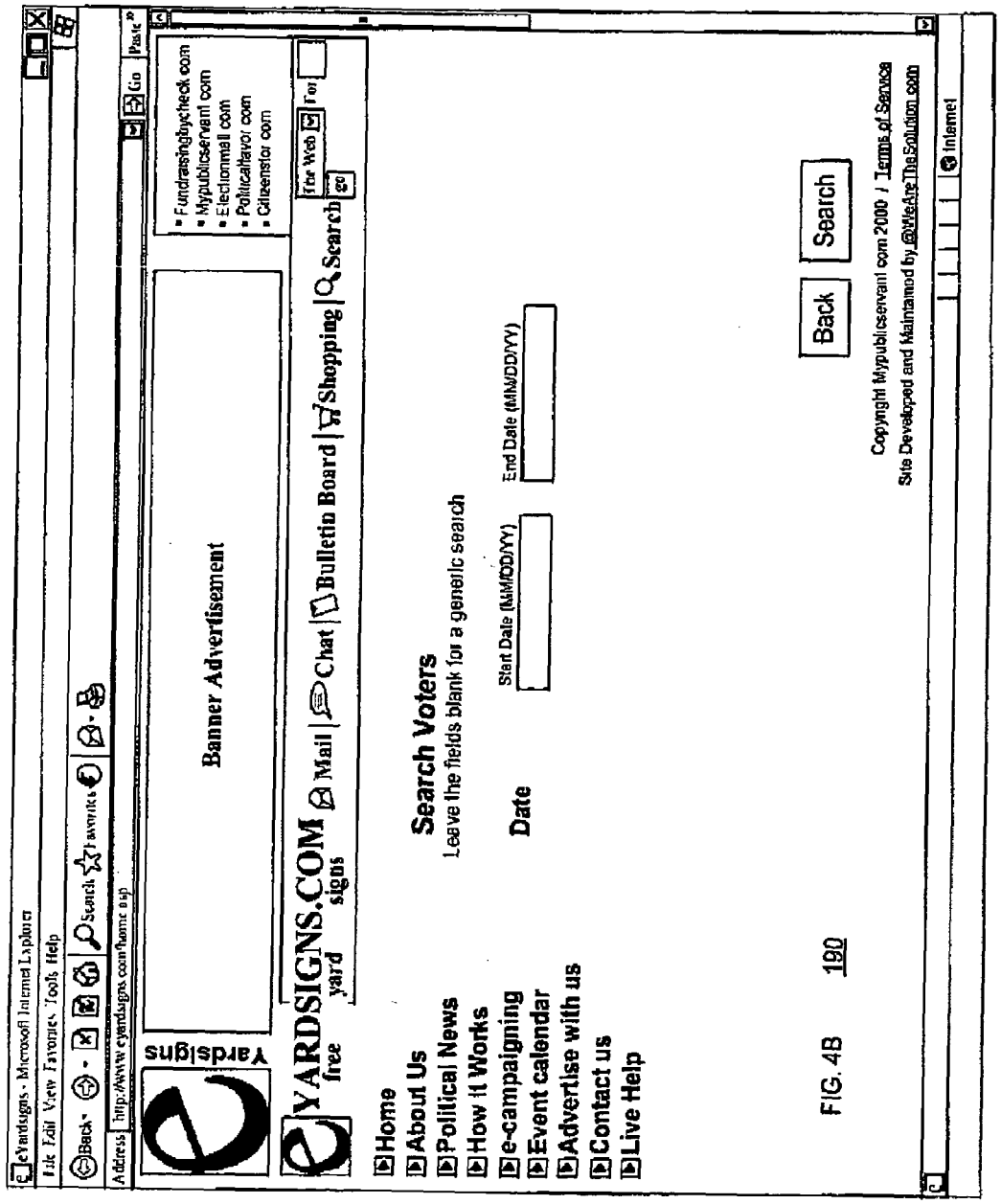
Figure 4C:
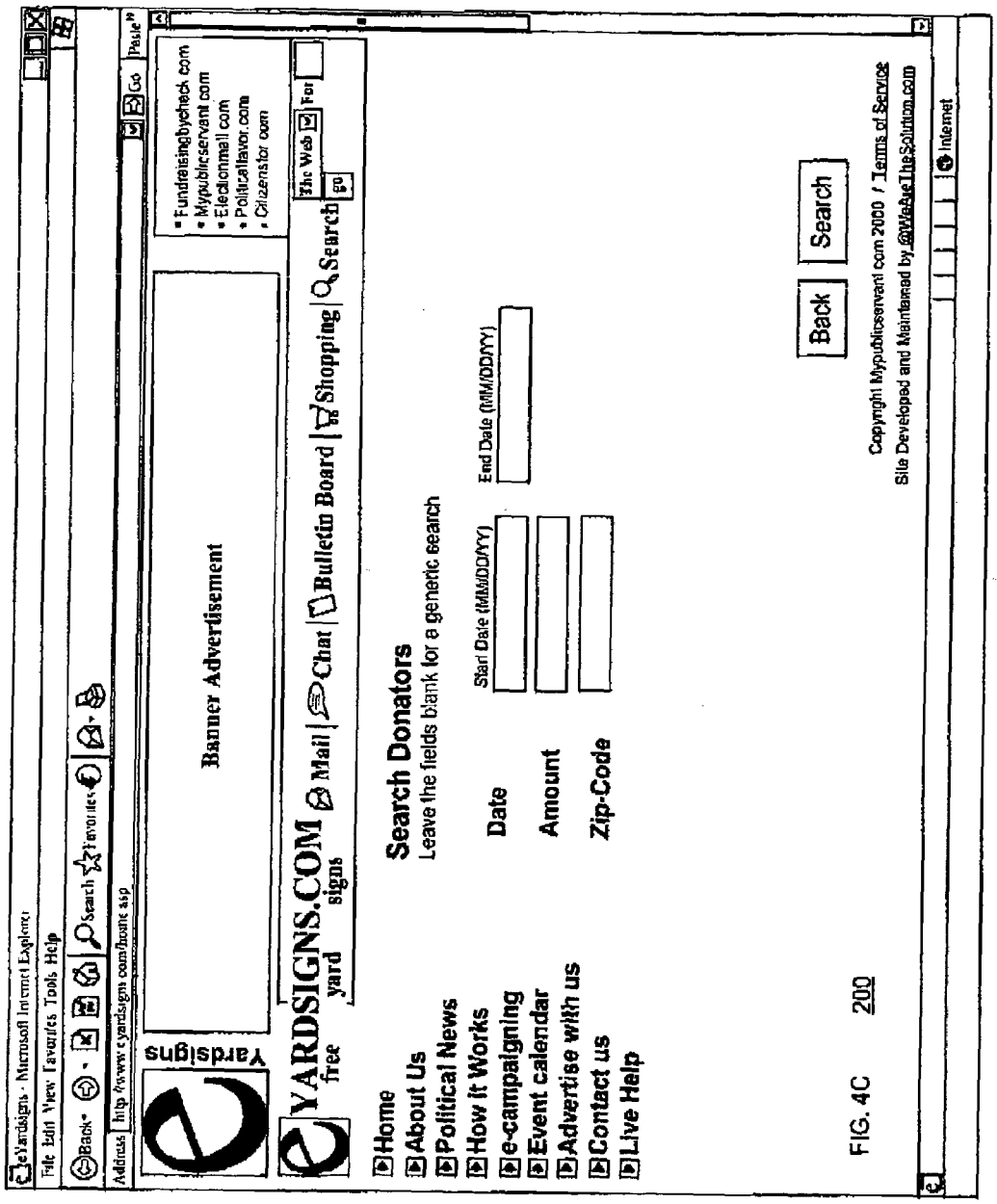
Figure 4D:
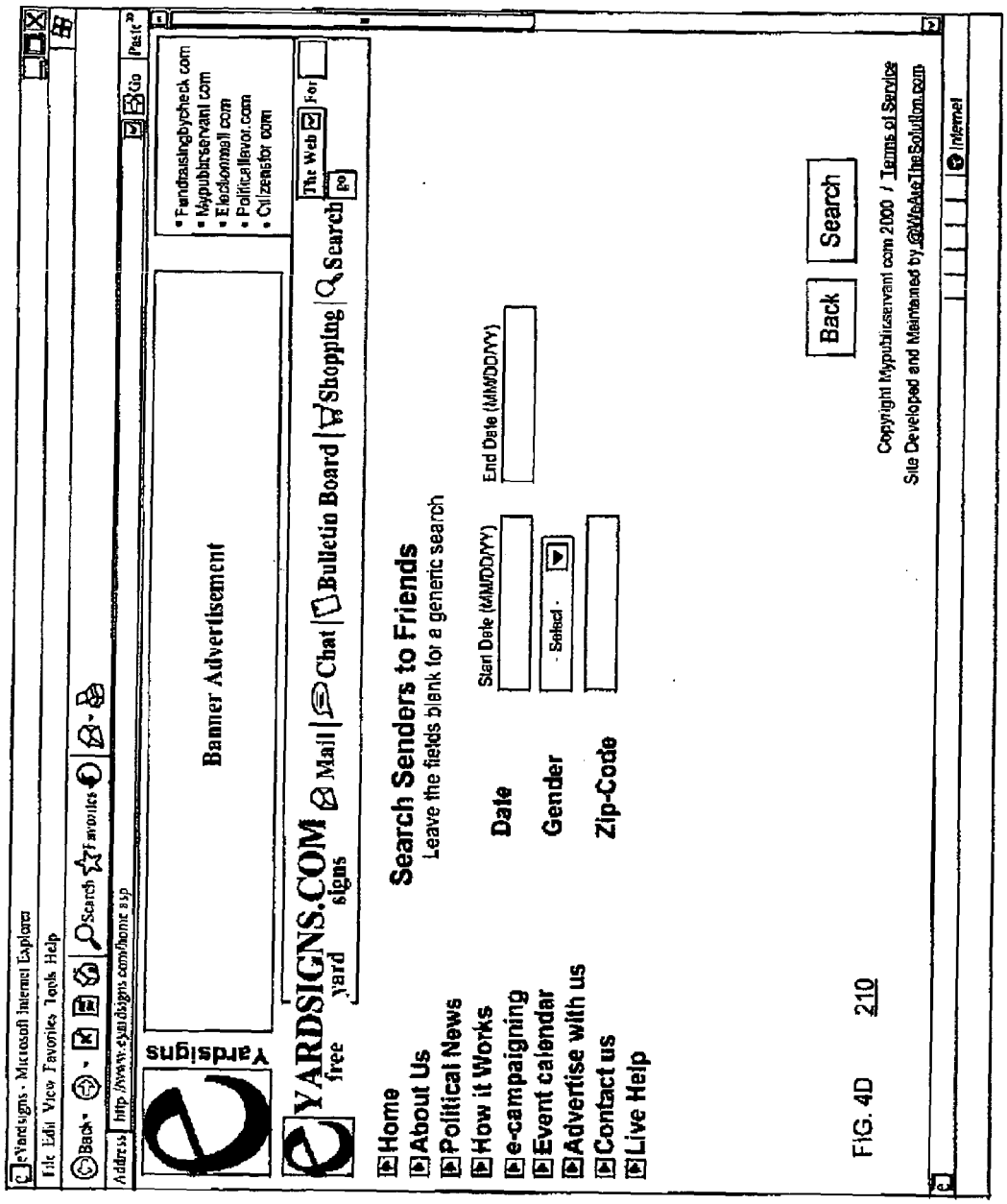

Referring to FIG. 2, the user may select a search function. Referring to FIGS. 4A–4D, and illustrated generally at 180, 190, 200, 210 the user may search for volunteers, voters, donators, and/or friends of recipients. Referring to FIG. 4A, the user may determine which services the recipient has selected, and the recipient's residence to determine if their services are needed. Referring to FIG. 4B, the user may search for voters pledged to vote for the candidate, and may also search for voter pledged to candidate during a selected period by filling in the date fields. This may allow the candidate to monitor voter sentiment during selected periods. The search results may be displayed in tabular and/or graph formats (illustrated generally at 220 in FIG. 5). Referring to FIG. 4C, the user may search by date, amount, and zip code for a donator list. By leaving the search fields blank a generic search may be run. Referring to FIG. 4D, the user may search by date, gender, and zip code for friends of recipients. A generic search may also be run.

Figure 7:
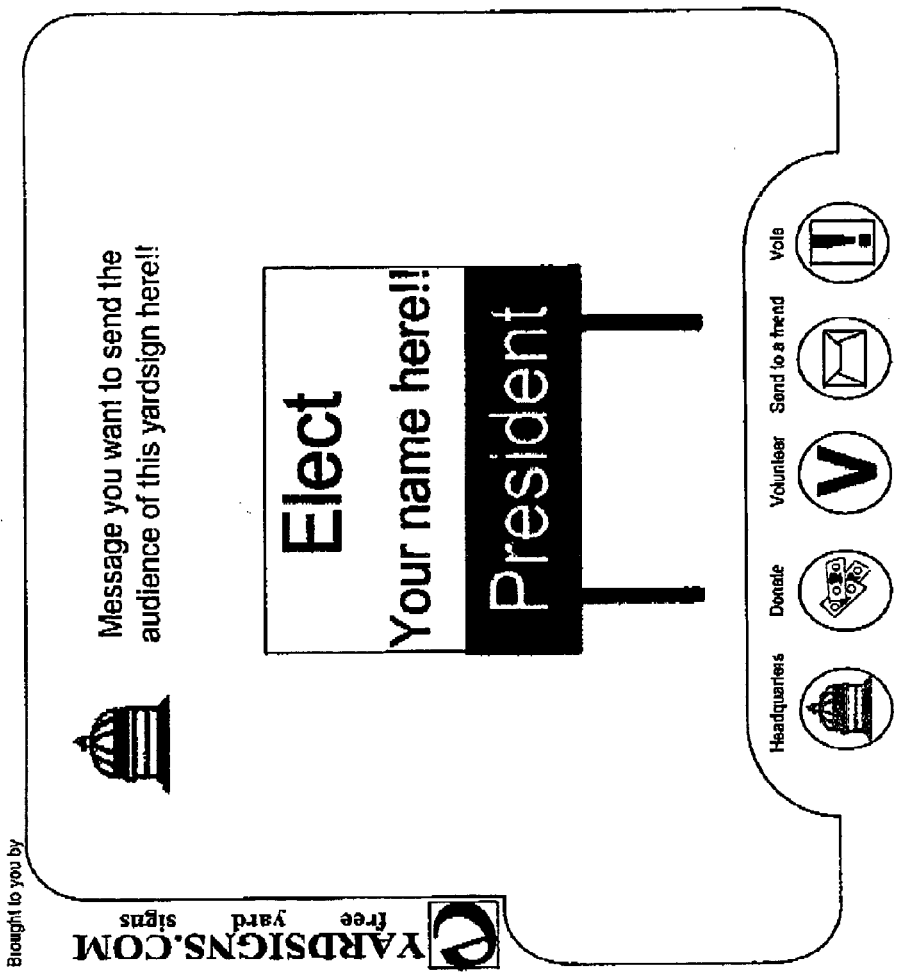
FIG. 7 illustrates a sample e-mail message of the present invention.

Referring to FIG. 7, a screen shot of a sample e-mail message of the present invention is shown generally at 300. The e-mail message may be in the form of a postcard, or postcard like graphic image. The postcard can include video-streaming capability in addition to text messages and images, and the like. The postcard can be customized with user custom images such as logos, photos and so on.

Figure 8:
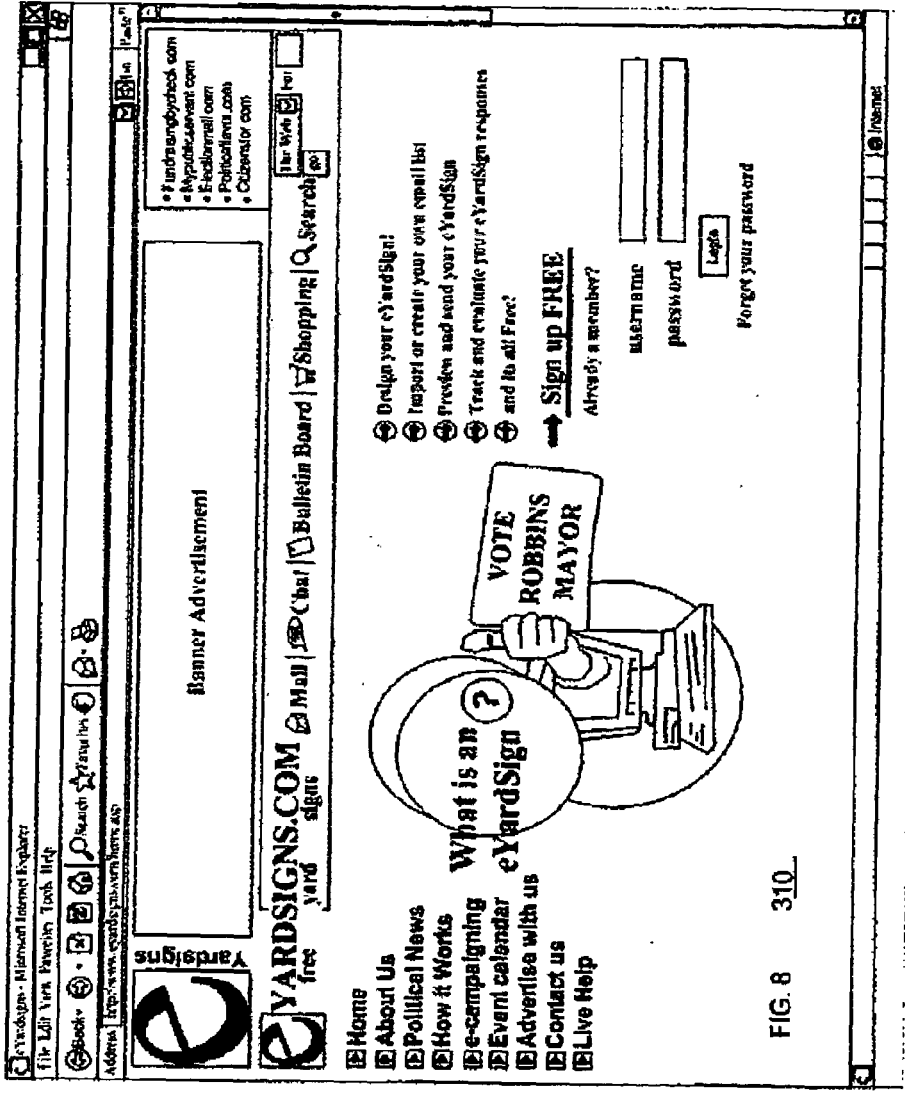
FIG. 8 illustrates another embodiment of a home page of the present invention.

Referring to FIG. 8, shown generally at 310, one embodiment of a home page is illustrated. The home page can include several functions such as, for example, and e-mail maintenance feature, in which the user may maintain e-mail lists. Once the lists are created the user may select a postcard creation feature, in which the user may create postcards. Another feature provided can be the results function, whereby the user may review the results of a mailed postcard. Further the home page may include feature whereby user may search various categories such as volunteers, friends, voters and contributors.

Figure 9:
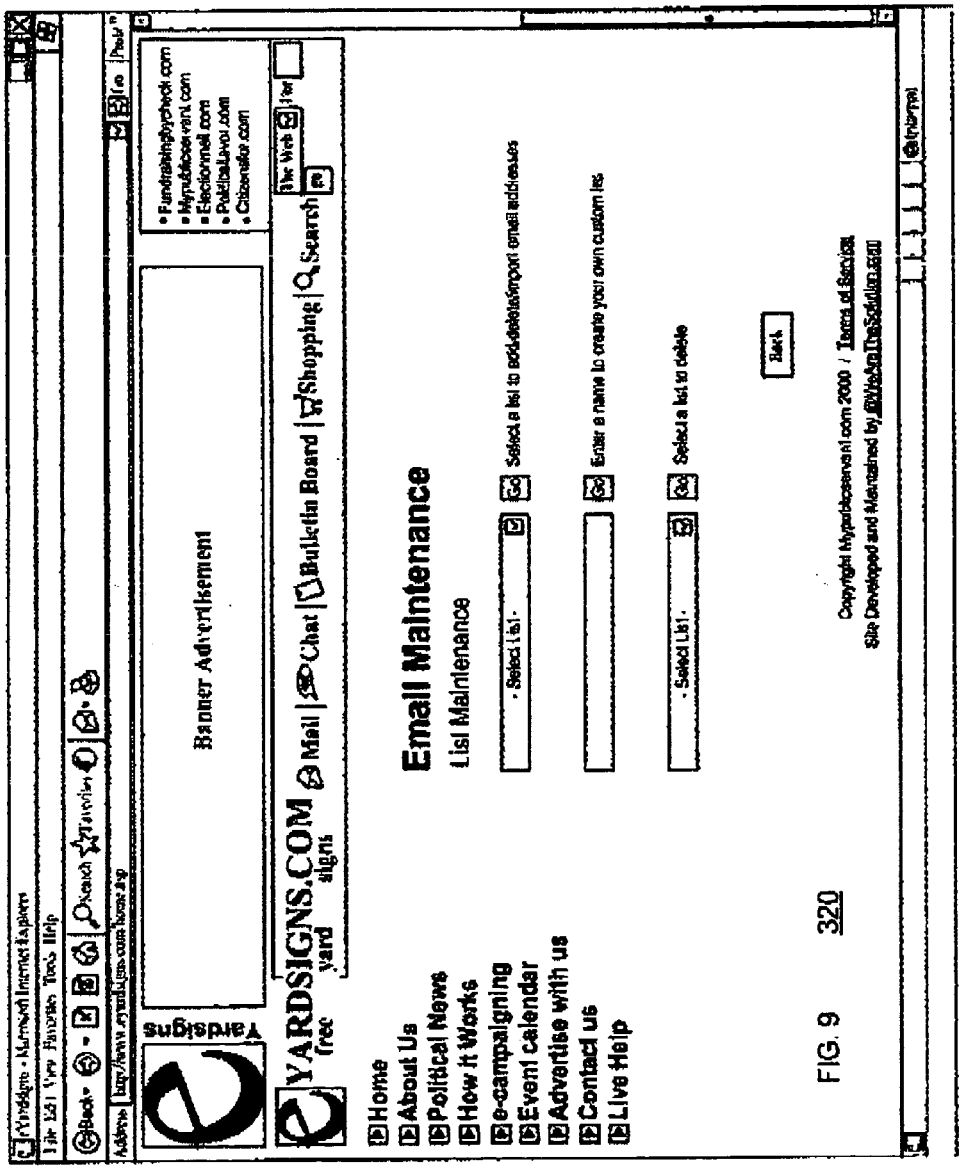
FIG. 9 illustrates an embodiment of an e-mail maintenance page.

Referring to FIG. 9, which is shown generally at 320, one embodiment of an e-mail maintenance page is illustrated. The e-mail maintenance page can include several features, for example, a list maintenance feature. The list maintenance feature provides user at the ability to select a list and add, delete or import e-mail addresses. The e-mail maintenance page can include a feature whereby user may create his or her own custom list. In addition user may delete lists.

Figure 10:
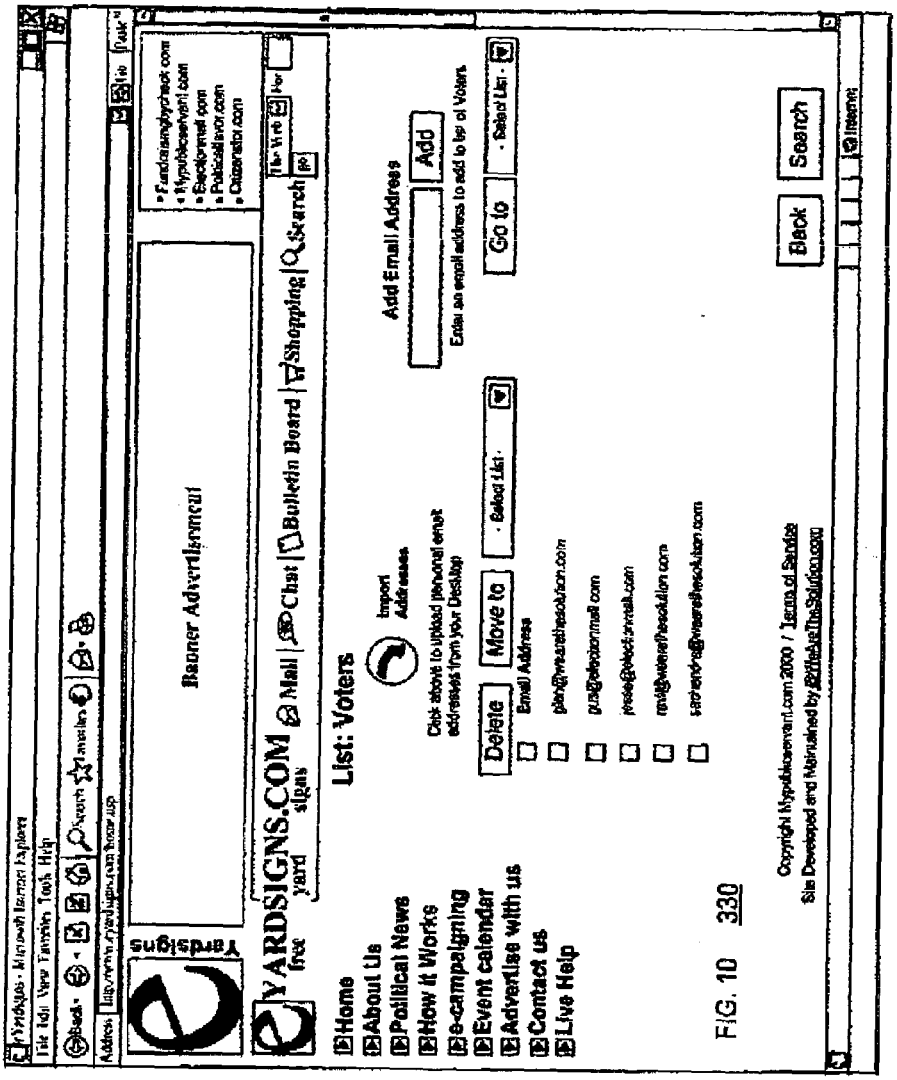
FIG. 10 illustrates one embodiment of a manage e-mails page.

Referring to FIG. 10, which is shown generally at 330, one embodiment of a manage e-mails page is illustrated. The e-mail management page can include features such as, for example, an import addresses feature. The import addresses feature provides a user the ability to import e-mail addresses are from a remote location such as a computer desktop. A further feature includes a provision whereby user may have an e-mail address to a list. Categories of lists may include lists directed to voters, contacts, clubs, and so on. A further future includes a provision whereby a user may delete e-mail addresses from a selected list, for example, by checking a box. A further feature provided on the e-mail management page can be a provision whereby the user may move e-mail addresses to another list.

Figure 10A:
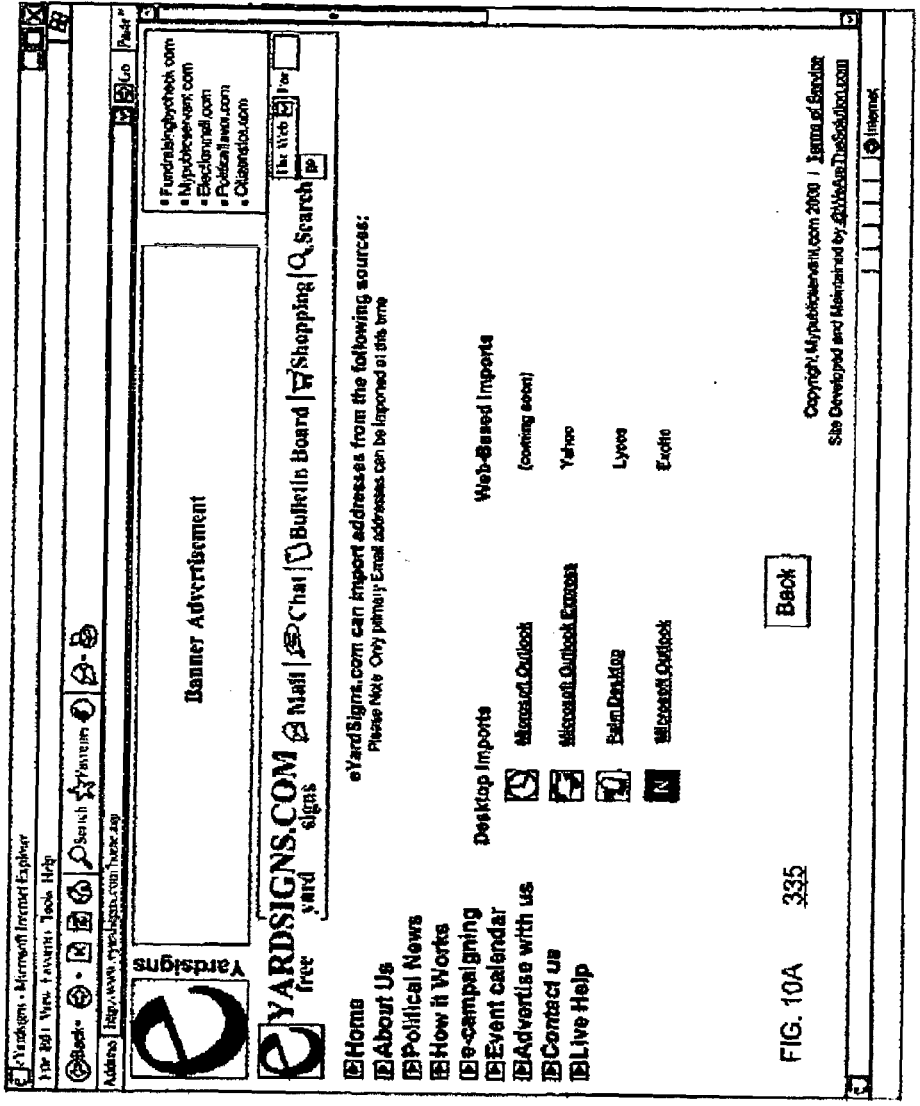
FIG. 10A illustrates one embodiment of an import e-mails page.

Referring to FIG. 10A, which is shown generally at 335, one embodiment of an import e-mails page is illustrated. It can be seen that this page provides a user the ability to import e-mails from a number of sources. The sources can include desktop import such as Microsoft Outlook, Microsoft Outlook Express, Palm Desktop and a Netscape Mail Client. Further web-based imports are possible. Web-based imports can include Yahoo, Lycos and Excite, for example.

Referring to FIG. 10B, which is shown generally at 360, one embodiment of an e-mail target page or feature is illustrated. It can be seen that this page provides a user the ability to selected list for e-mailing. The user may select who will receive the list and e-mails. Further user can send a list of more than one last to one individual.

Figure 11:
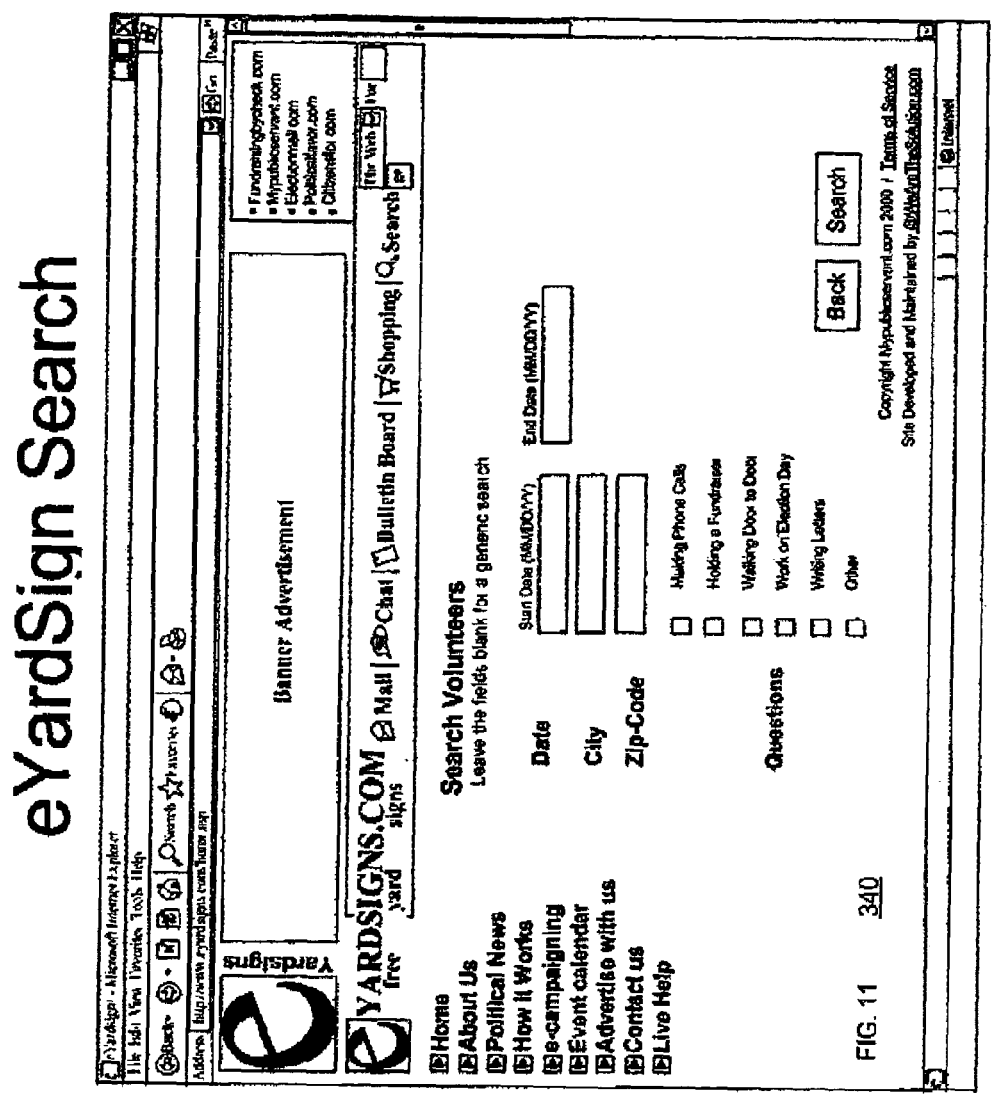

Referring to FIG. 11, which is shown generally at 340, one embodiment of a search page or feature is illustrated.

The user can search by date, for example, start date and end date, city, zip code and various questions such as volunteers who make phone calls, hold fundraisers, perform door-to-door operations, work on election day, write letters and so on.

Referring to FIG. 12, which is shown generally at 350, one embodiment of a poll feature page or function is illustrated. This page can include at a feature whereby user can produce a graph of the results presented by a percentage or graphical images. The contact name and profile can be matched, stored and collected in respect to the poll issue. The tracking of the exact date and time of the poll itself in the user's response time can be presented. It is also possible to query the results of the poll itself.

Figure 13:
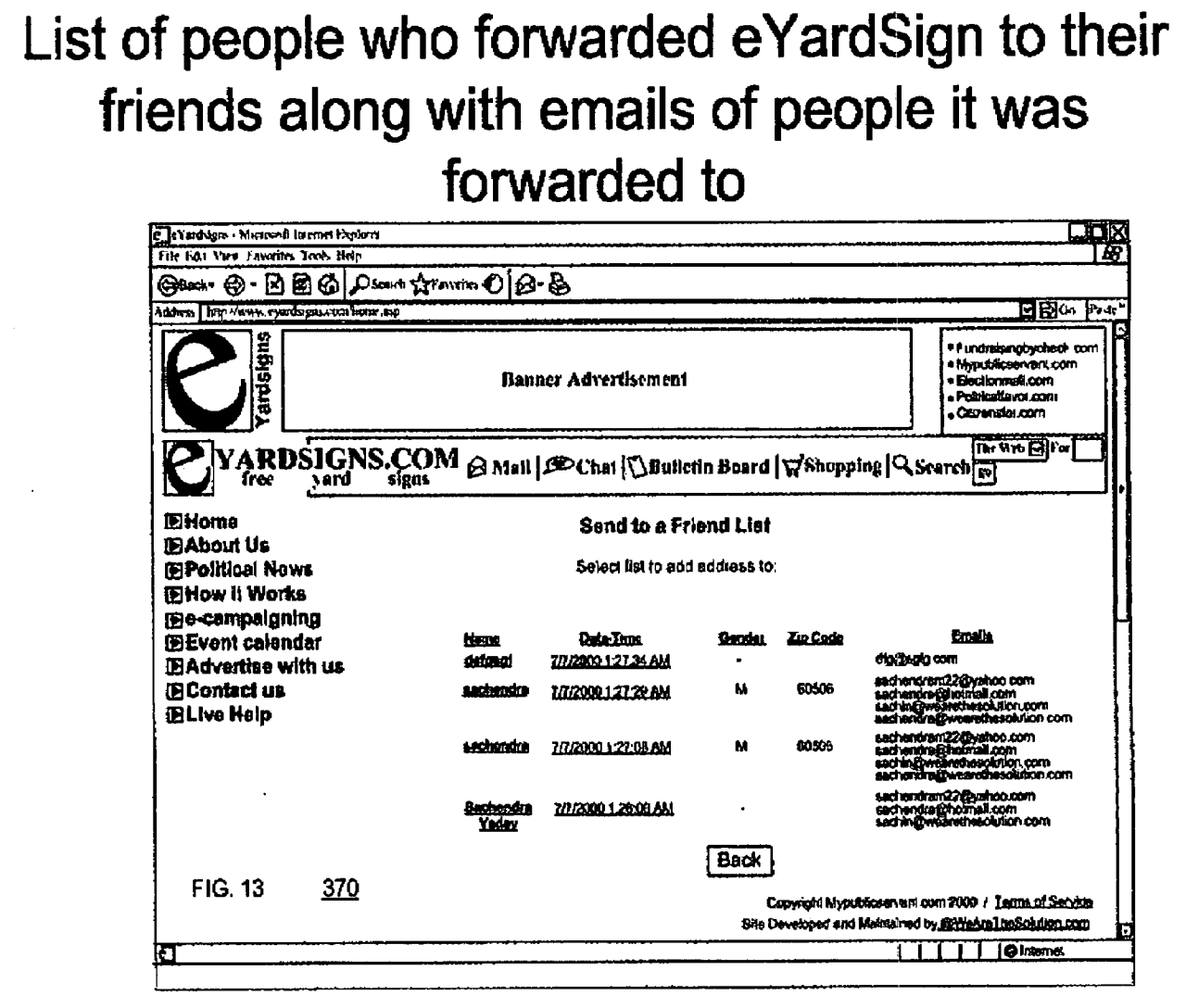

Referring to FIG. 13, which is shown generally at 370, one embodiment of an e-mail result page is illustrated. With this feature a user can view contacts on a selected list and how many e-mails were generated by each contact.

Figure 14:
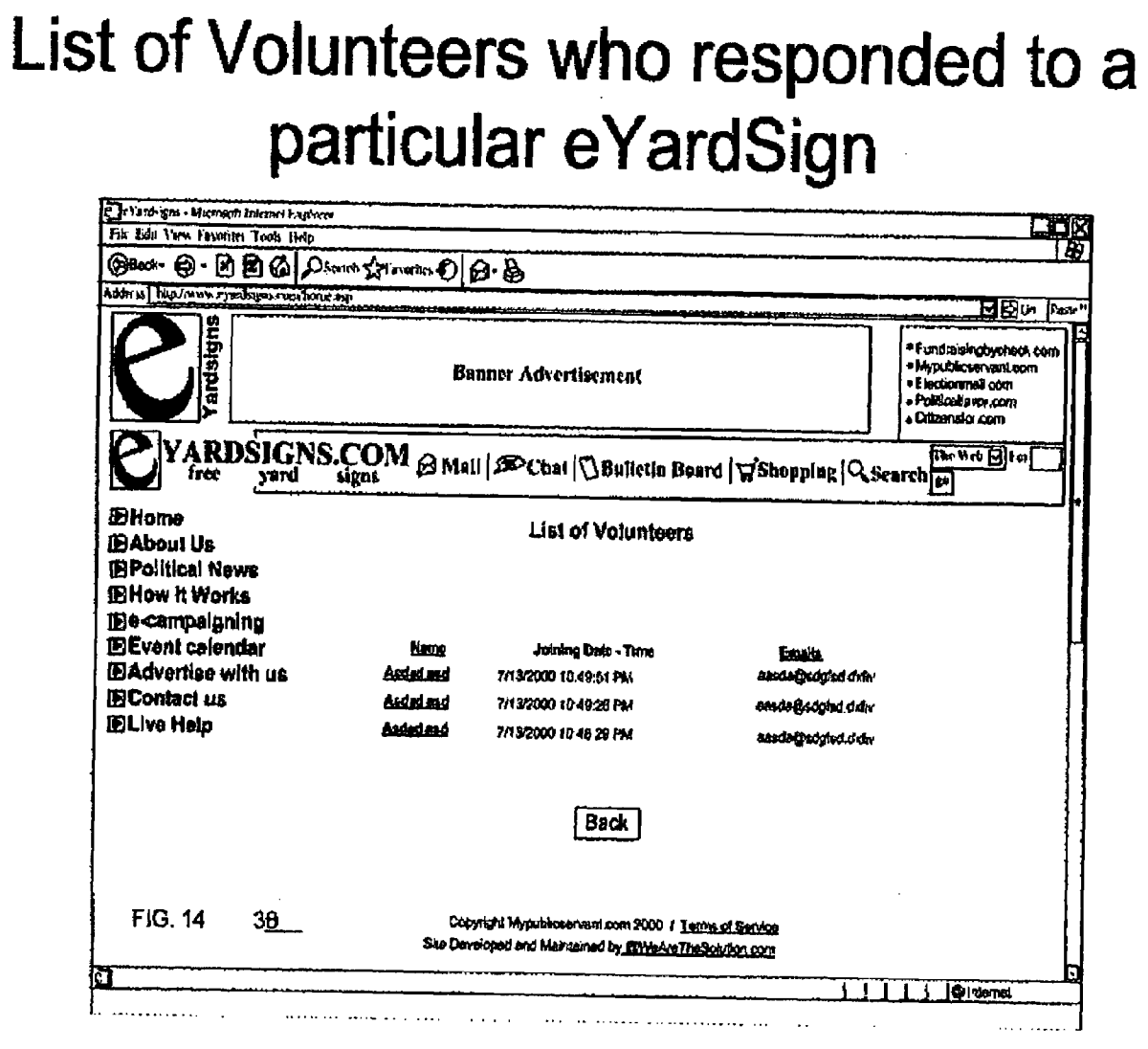

Referring to FIG. 14, which is shown generally at 380, one embodiment of a volunteer result page is illustrated. This feature a user can gather data about volunteers such as name, joining date, and an e-mail address.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. Method of tracking information relating to email recipients for campaign purposes comprising:
    sending an electronic yard sign from a communication node on a selected list, the electronic yard sign including at least one recipient function, wherein the electronic yard sign is an electronic re-creation of a physical campaign yard sign operable to be physically placed in a yard for campaign purposes;
    receiving recipient input from the recipient function at the node;
    storing the recipient input in a database; and
    searching the database of recipient input.

2. The method of claim 1 wherein the recipient function is selected from the list consisting of: voluntary services to candidate campaign, indicating support for candidate; making donation to campaign, and sending electronic yard sign to others.

3. A signal bearing medium tangibly embodying a program of machine-readable instructions executable by a processor to perform operations comprising:
    sending an electronic yard sign from a communication node on a selected list, the electronic yard sign including a recipient function, wherein the electronic yard sign is an electronic re-creation of a physical campaign yard sign operable to be physically placed in a yard for campaign purposes;
    receiving recipient input from the recipient function at the node; and
    storing the recipient input in a database.

4. The signal bearing medium of claim 3, wherein the recipient function is volunteering services to a candidate campaign.

5. The signal bearing medium of claim 3, wherein the recipient function is indicating support for a candidate.

6. The signal bearing medium of claim 3, wherein the recipient function is making a donation to a campaign.

7. The signal bearing medium of claim 3, wherein the recipient function is sending the electronic yard sign to others.

8. The signal bearing medium of claim 3, wherein the operations further comprise:
   searching the database of the recipient input.

9. A system, comprising:
   means for sending an electronic yard sign from a communication node on a selected list, the electronic yard sign including a recipient function, wherein the electronic yard sign is an electronic re-creation of a physical campaign yard sign operable to be physically placed in a yard for campaign purposes;
   means for receiving recipient input from the recipient function at the node; and
   means for storing the recipient input in a database.

10. The system of claim 9, wherein the recipient function is volunteering services to a candidate campaign.

11. The system of claim 9, wherein the recipient function is indicating support for a candidate.

12. The system of claim 9, wherein the recipient function is making a donation to a campaign.

13. The system of claim 9, wherein the recipient function is sending the electronic yard sign to others.

14. The system of claim 9, further comprising:
   means for searching the database of the recipient input.

* * * * *